(12) United States Patent
Nishiyama

(10) Patent No.: US 11,270,458 B2
(45) Date of Patent: Mar. 8, 2022

(54) IMAGE GENERATING DEVICE

(71) Applicant: Furuno Electric Co., Ltd., Nishinomiya (JP)

(72) Inventor: Koji Nishiyama, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 182 days.

(21) Appl. No.: 16/690,946

(22) Filed: Nov. 21, 2019

(65) Prior Publication Data

US 2020/0090367 A1 Mar. 19, 2020

Related U.S. Application Data

(63) Continuation-in-part of application No. PCT/JP2018/018648, filed on May 15, 2018.

(30) Foreign Application Priority Data

May 24, 2017 (JP) .............................. JP2017-103150

(51) Int. Cl.
*G06T 19/00* (2011.01)
*G06T 7/73* (2017.01)
(Continued)

(52) U.S. Cl.
CPC .............. *G06T 7/73* (2017.01); *G06T 19/006* (2013.01); *H04N 5/23293* (2013.01); *H04N 13/366* (2018.05)

(58) Field of Classification Search
CPC ................................ G06T 7/73; G06T 19/006
See application file for complete search history.

(56) References Cited

U.S. PATENT DOCUMENTS

2014/0160165 A1 6/2014 Kim et al.
2015/0330804 A1 11/2015 Okuda et al.
2015/0350552 A1* 12/2015 Pryszo ............... H04N 5/23299
348/143

FOREIGN PATENT DOCUMENTS

EP 2466258 A1 6/2012
JP H06301897 A * 10/1994 ............. B63B 49/00
(Continued)

OTHER PUBLICATIONS

European Patent Office, Extended European Search Report Issued in Application No. 18806358.0, dated Dec. 8, 2020, Germany, 7 pages.

*Primary Examiner* — Tuan H Nguyen
(74) *Attorney, Agent, or Firm* — Alleman Hall Creasman & Tuttle LLP

(57) ABSTRACT

The present disclosure provides an image generating device that includes processing circuitry configured to acquire an image captured by an imaging device to be installed in a water-surface movable body, acquire positional information indicative of a position of the water-surface movable body, acquire posture information indicative of a posture of the water-surface movable body, acquire additional display information including information indicative of positions of one or more locations, generate a synthesized image where a graphic rendering a three-dimensional virtual reality object indicative of the additional display information is synthesized on the captured image based on the positional information, the posture information, and the additional display information, and place the graphic across a boundary of the captured image when the captured image is placed only in a certain portion of the synthesized image.

19 Claims, 15 Drawing Sheets

(51) Int. Cl.
*H04N 13/366* (2018.01)
*H04N 5/232* (2006.01)

(56) References Cited

FOREIGN PATENT DOCUMENTS

| | | |
|---|---|---|
| JP | 2010003274 A | 1/2010 |
| JP | 2011259152 A | 12/2011 |
| JP | 2015215278 A | 12/2015 |

* cited by examiner

IMAGE GENERATING DEVICE

CROSS-REFERENCE TO RELATED APPLICATION

This application is a continuation-in-part of PCT International Application PCT/JP2018/018648, which was filed on May 15, 2018, and which claims priority to Japanese Patent Application Ser. No. 2017-103150 filed on May 24, 2017, the entire disclosures of each of which are herein incorporated by reference for all purposes.

TECHNICAL FIELD

The present disclosure relates to an image generating device. In detail, the present disclosure relates to an image generating device which generates an image indicative of a situation around a water-surface movable body.

BACKGROUND

For example, this kind of image generating device is disclosed in Patent Document 1. The image generating device of Patent Document 1 includes a camera, an imaging data receiving part, a position acquiring part, an image generating part, a target object display item generating part, and a display unit, and is configured to perform geo-referencing of the image stream from the camera.

In Patent Document 1, the imaging data receiving part receives the stream image data captured by the camera of a ship. The position acquiring part acquires the position of a target object around the ship (another ship etc.). The image generating part generates an image to be displayed on the display unit based on the image of the stream image data. The image supports the position and the view of the camera. The target object display item generating part generates a target object display item indicative of the target object at a point on the image. The display is configured to display the image, and the target object display item placed at the point on the image.

The image generating part generates the image by projecting the image on a three-dimensional virtual space in which points correspond to the points on the image, and the environment around the water-surface movable body is indicated. Further, the target object display item generating part generates the target object display item based on positional information on the target object, and the points of the three-dimensional virtual space. [Reference

DOCUMENT OF CONVENTIONAL ART

Patent Document

Patent Document 1 US2015/0350552A1

When imaging the situation around the water-surface movable body for monitoring etc., it is generally desirable to image a wide horizontal angle range to be seen. However, since the angle of view of the camera is limited, the captured image of all directions of 360 degrees around the water-surface movable body cannot be always acquired.

In this regard, although Patent Document 1 discloses that a target object displaying item is displayed so that it is placed at a location in the image captured by the camera, Patent Document 1 does not describe about what kind of indication is given for a range (direction) in which the captured image of the camera cannot be obtained, or whether the indication for the range is not carried out.

The present disclosure is made in view of the above situation, and one purpose thereof is to enable to confirm a situation around a water-surface movable body also for a direction different from an imaging direction of an imaging device.

SUMMARY

The problem to be solved by the present disclosure is as described above, and means to solve the problem and the effect thereof is described below.

According to one aspect of the present disclosure, an image generating device with the following configuration is provided. That is, the image generating device, comprising processing circuitry configured to acquire an image captured by an imaging device to be installed in a water-surface movable body, acquire positional information indicative of a position of the water-surface movable body, acquire posture information indicative of a posture of the water-surface movable body, acquire additional display information including information indicative of positions of one or more locations, generate a synthesized image where a graphic rendering a three-dimensional virtual reality object indicative of the additional display information is synthesized on the captured image based on the positional information, the posture information, and the additional display information, and place the graphic across a boundary of the captured image when the captured image is placed only in a certain portion of the synthesized image.

According to this configuration, the virtual reality indication can be realized by creating the synthesized image so that the graphic indicative of the position etc. of the additional display information is superimposed on the captured image based on the position and the posture of the water-surface movable body. Moreover, for example, since the additional display information in a direction different from the imaging direction of the imaging device can be confirmed by the graphic, the user can confirm the additional display information in a wide range of direction. Further, since the graphic can be placed across both the area with the captured image and the area without the captured image, the user can grasp the situation indicated by the additional display information, while seamlessly viewing both the part where the captured image is placed and the other part.

In the image generating device, the processing circuitry is further configured to synthesize with the captured image the graphic rendering the virtual reality object where the additional display information is based on at least any of a length, a width, a bow direction of the ship.

According to one aspect of the present disclosure, a method of generating an image with the following configuration is provided. That is, acquiring an image captured by an imaging device to be installed in a water-surface movable body, acquiring positional information indicative of a position of the water-surface movable body, acquiring posture information indicative of a posture of the water-surface movable body, acquiring additional display information including information indicative of positions of one or more locations, generating a synthesized image where a graphic rendering a three-dimensional virtual reality object indicative of the additional display information is synthesized on the captured image based on the positional information, the posture information, and the additional display information; and placing the graphic across a boundary of the captured

DETAILED DESCRIPTION

Figure 1:
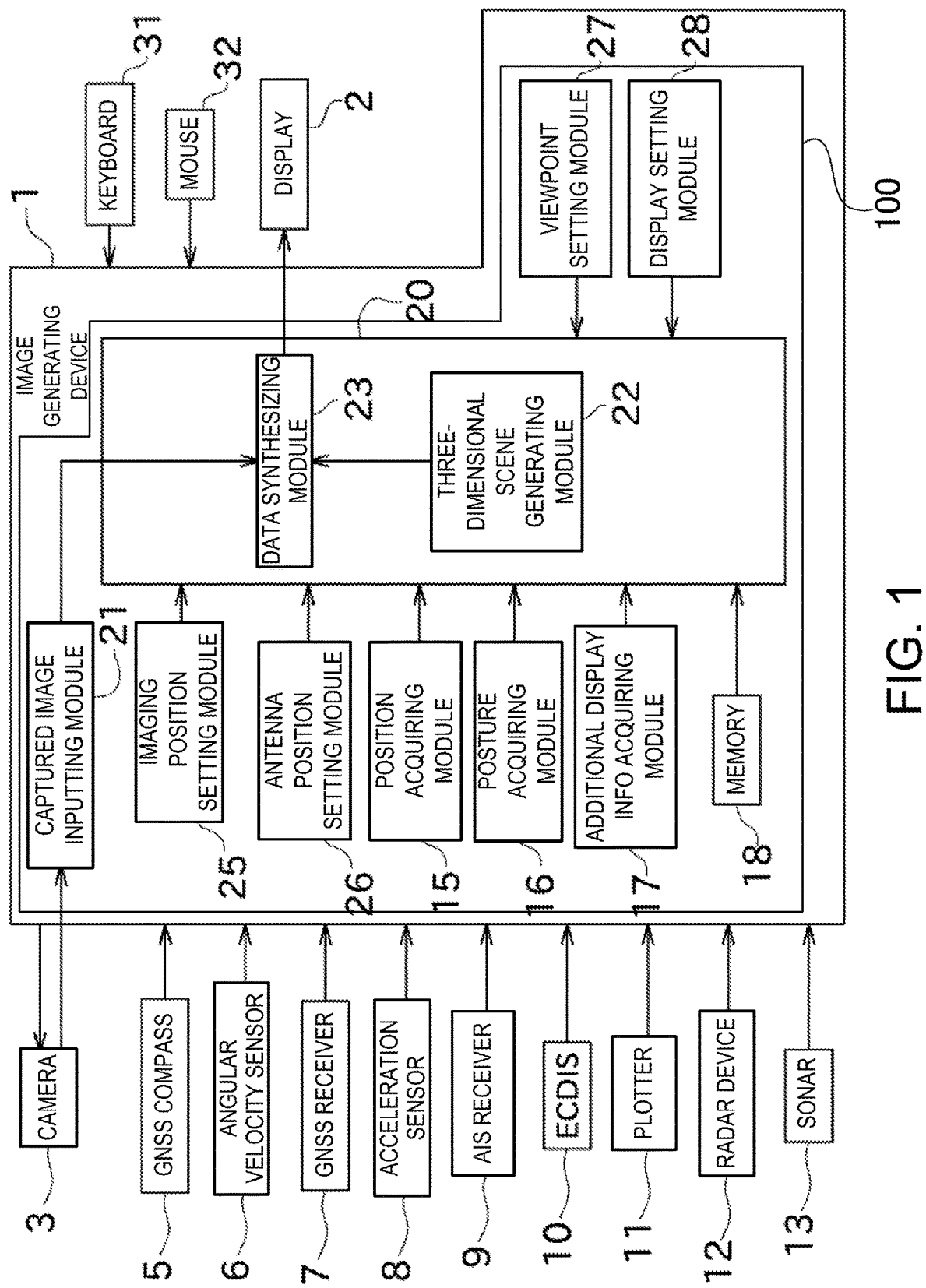
FIG. 1 is a block diagram illustrating the entire configuration of an image generating device according to one embodiment of the present disclosure.
Figure 2:
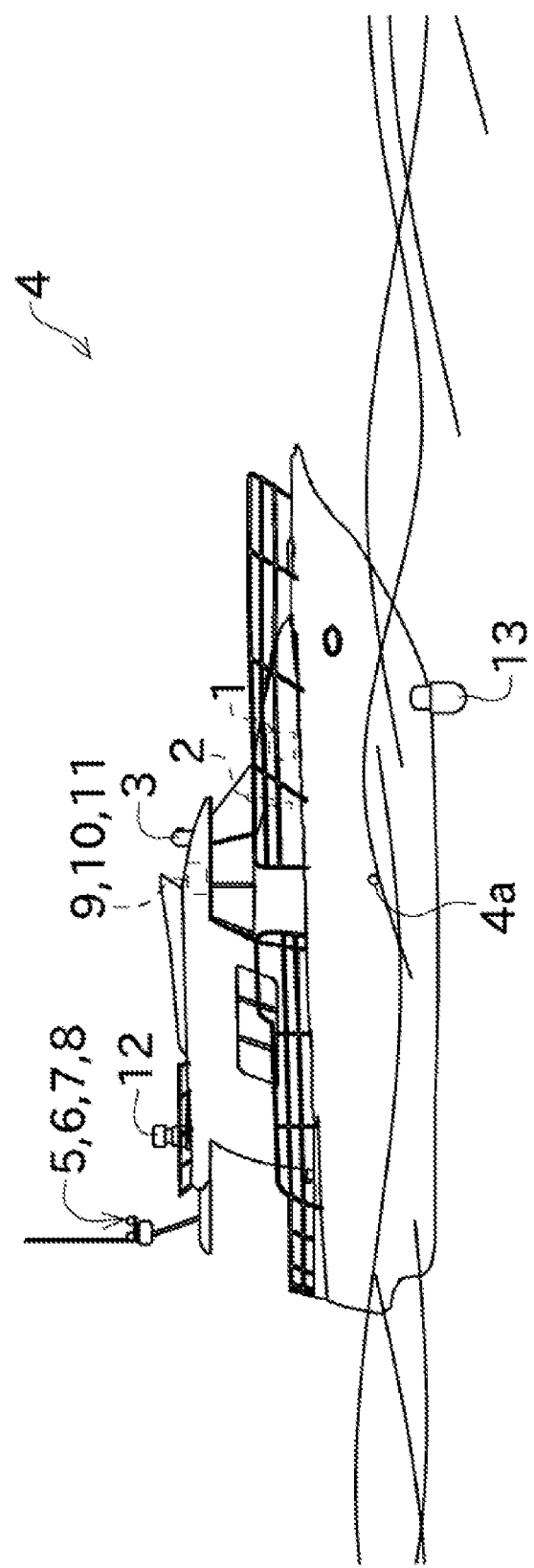
FIG. 2 is a side view illustrating various kinds of instruments mounted on a ship.

Next, one embodiment of the present disclosure is described with reference to the drawings. FIG. 1 is a block diagram illustrating the entire configuration of an image generating device 1 according to one embodiment of the present disclosure. FIG. 2 is a side view illustrating various kinds of instruments mounted on a ship 4.

The image generating device 1 illustrated in FIG. 1 may be a device which is mounted on the ship (water-surface movable body) 4 as illustrated, for example, in FIG. 2, and may generate an image expressing the situation around the ship 4 in virtual reality based on the image captured by a camera (imaging device) 3. The image generated by the image generating device 1 may be displayed on a display unit 2.

The display unit 2 may be configured as, for example, a display unit for a navigation assisting device to which a ship operator who operates the ship 4 refers. However, the display unit 2 is not limited to the above configuration, and, for example, it may be a display unit for a portable computer which is carried by a ship operator's assistant who monitors the surrounding situation from the ship 4, a display unit for a passenger to watch in the cabin of the ship 4, or a display part for a head mounted display, such as a wearable glass, worn by a passenger.

The image generating device 1 may generate a synthesized image which is an output image to the display unit 2 by synthesizing the image around the ship 4 captured by the camera 3 installed in the ship 4, and graphics which expresses additional display information on the perimeter of the ship 4 in virtual reality (as will be described in detail later).

Next, mainly referring to FIG. 1, the camera 3 and various kinds of ship instruments which may be electrically connected to the image generating device 1 are described.

The camera 3 may be configured as a wide-angle video camera which images the perimeter of the ship 4. This camera 3 may have a live output function, capable of generating video data (image data) as the imaged result on real time, and outputting it to the image generating device 1. As illustrated in FIG. 2, the camera 3 may be installed in the ship 4 so that an imaging direction becomes horizontally forward of the hull.

The camera 3 may be attached to the ship 4 through a rotating mechanism (not illustrated) and, therefore, the imaging direction can be changed in a given angle range on the basis of the hull of the ship 4 by inputting a signal for instructing pan/tilt from the image generating device 1. Moreover, since the height and the posture of the ship 4 variously change due to waves etc., the height of the camera 3 may change in connection with the change, and the posture (imaging direction) may also change three-dimensionally.

The image generating device 1 of this embodiment may be electrically connected to, in addition to the camera 3, a GNSS compass (a direction sensor, a posture sensor) 5, an angular velocity sensor 6, a GNSS receiver 7, an acceleration sensor 8, an AIS receiver 9, an ECDIS 10, a plotter 11, a radar device 12, and a sonar 13, etc. as the ship instrument.

The GNSS compass 5 may be provided with a plurality of GNSS antennas (positioning antenna) fixed to the ship 4. The GNSS compass 5 may calculate spatial relationships of the GNSS antennas based on radio waves received from positioning satellites. Particularly, the GNSS compass 5 of this embodiment may be configured to obtain the spatial relationships of the GNSS antennas based on phase differences of carrier phases of the radio waves received by the respective GNSS antennas (since this processing is known, detailed description thereof is omitted). Therefore, a bow direction of the ship 4 can be acquired with sufficient accuracy.

The GNSS compass 5 may acquire the posture of the ship 4 three-dimensionally. In other words, the GNSS compass 5 may detect a roll angle and a pitch angle of the ship 4, as well as the bow direction (i.e., yaw angle of the ship 4). The posture information on the ship 4 acquired by the GNSS compass 5 may be outputted to a posture acquiring module 16 of the image generating device 1, and other ship instruments utilizing the posture information.

The angular velocity sensor 6 may be, for example, comprised of a known oscillating gyroscope sensor, which is capable of detecting a yaw angular velocity, a roll angular velocity, and a pitch angular velocity of the ship 4 at a cycle shorter than a posture detection interval of the GNSS compass 5 (e.g., 1 second). By using both an angle detected by the GNSS compass 5 and an integrated value of the angular velocity detected by the angular velocity sensor 6, the posture of the ship 4 can be acquired at a time interval shorter than the case where only the GNSS compass 5 is used. Moreover, the angular velocity sensor 6 may function as an alternative for acquiring the posture information, when the radio wave from the positioning satellite is interrupted with an obstacle, such as a bridge, and the posture becomes undetectable by the GNSS compass 5.

The GNSS receiver 7 may find the position of the ship 4 (in detail, a latitude, a longitude, and a height of the GNSS antenna) based on the radio waves which the GNSS antennas received from the positioning satellites. The GNSS receiver 7 may output the acquired positional information to a position acquiring module 15 of the image generating device 1, and/or other ship instruments utilizing the positional information.

The acceleration sensor 8 may be configured, for example, as a known capacitance detection type sensor, which is capable of detecting accelerations about the yaw axis, the roll axis, and the pitch axis of the ship 4 at a cycle shorter than a position detection interval of the GNSS receiver 7 (e.g., 1 second). By using both the position detected by the GNSS receiver 7, and a double integrated value of the acceleration detected by the acceleration sensor 8, the position of the ship 4 can be acquired at a time interval shorter than the case where only the GNSS receiver 7 is used. Moreover, the acceleration sensor 8 may function as an alternative for acquiring the positional information, when the radio wave from the positioning satellite is interrupted, and the detection of the position is impossible by the GNSS receiver 7.

In this embodiment, as illustrated in FIG. 2, the angular velocity sensor 6, the GNSS receiver 7, and the acceleration sensor 8 may be built in the GNSS compass 5. However, some or all of the angular velocity sensor 6, the GNSS receiver 7, and the acceleration sensor 8 may be provided independently from the GNSS compass 5.

The AIS receiver 9 may receive AIS information transmitted from another ship, a land station, etc. The AIS information may include various information, such as a position (latitude and longitude) of another ship which travels around the ship 4, a length and a width of another ship, and a type and identifying information of another ship, a ship speed, a course, a destination of another ship, and a position and identifying information of a landmark.

The ECDIS 10 may acquire the positional information on the ship 4 from the GNSS receiver 7 and output the information on the perimeter of the ship 4 to the image generating device 1 based on electronic nautical chart information stored beforehand.

The plotter 11 may generate information on a traveling trail of the ship 4 by continuously acquiring the position of the ship 4 from the GNSS receiver 7. Moreover, by allowing a user to set a plurality of waypoints (points through which the ship 4 is scheduled to pass), the plotter 11 can generate a scheduled route by sequentially connecting these waypoints.

The radar device 12 may detect a target object, such as another ship, which exists around the ship 4. Moreover, the radar device 12 may have a known target tracking function (Target Tracking, TT) which acquires and tracks the target object, and may find a position and a velocity vector (TT information) of the target object.

The sonar 13 may detect a school of fish etc. by transmitting an ultrasonic wave underwater and receiving a reflective wave which is the ultrasonic wave reflected on the school of fish etc.

The image generating device 1 may be connected to a keyboard 31 and a mouse 32 which the user operates. The user can perform various kinds of instructions about generation of an image by operating the keyboard 31 and the mouse 32. The instructions may include the pan/tilt operation of the camera 3, setting of displaying or not-displaying of various information, and a setup of a viewpoint of a synthesized image.

Next, a configuration of the images generating device 1 is described in detail mainly referring to FIG. 1.

As illustrated in FIG. 1, the image generating device 1 may include a captured image inputting module 21, the position acquiring module 15, the posture acquiring module 16, an additional display information acquiring module 17, a memory 18, an imaging position setting module 25, an antenna position setting module 26, a viewpoint setting module 27, a display setting module 28, and a synthesized image generating module 20.

In detail, although the image generating device 1 is configured as a known computer (which is also referred to as processing circuitry 100) and is not illustrated, it may include a CPU, a ROM, a RAM, and a HDD. Further, the image generating device 1 may be provided with a GPU for performing three-dimensional image processing (described later) at high speed. The HDD stores, for example, software for performing image synthesizing method of the present disclosure. By collaboration of the hardware and the software, the image generating device 1 can be functioned as the captured image inputting module 21, the position acquiring module 15, the posture acquiring module 16, the additional display information acquiring module 17, the memory 18, the imaging position setting module 25, the antenna position setting module 26, the viewpoint setting module 27, the display setting module 28, the synthesized image generating module 20, etc.

The captured image inputting module 21 may accept an input of image data outputted from the camera 3, for example, at 30 frames per second. The captured image inputting module 21 may output the inputted image data to the synthesized image generating module 20 (a data synthesizing module 23 described later).

The position acquiring module 15 may acquire the current position of the ship 4 on real time based on the detection results of the GNSS receiver 7 and the acceleration sensor 8.

The posture acquiring module 16 may acquire the current posture of the ship 4 on real time based on the detection results of the GNSS compass 5 and the angular velocity sensor 6.

Figure 3:
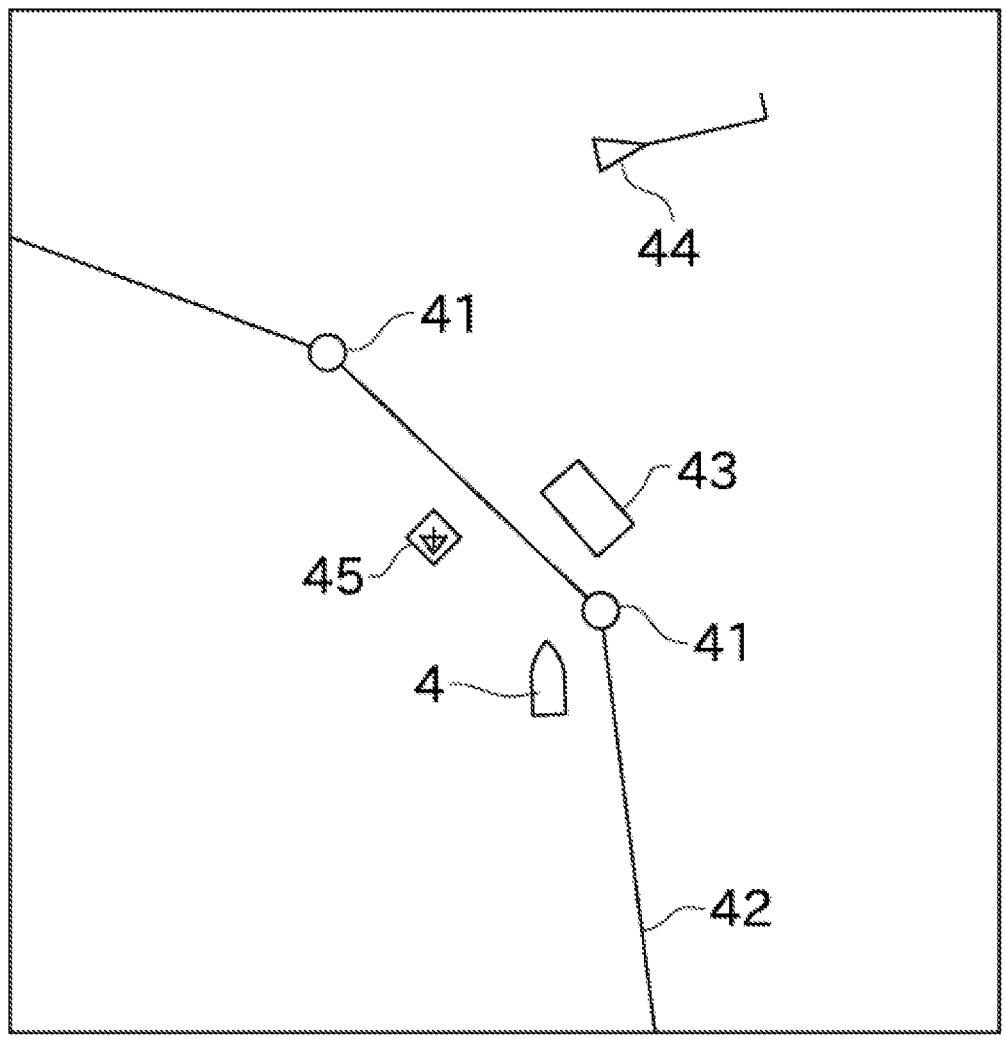
FIG. 3 is a conceptual diagram illustrating one example of the additional display information to be displayed in the image generating device.

The additional display information acquiring module 17 may acquire information to be displayed in addition to the image captured by the camera 3 (additional display information) based on information outputted to the image generating device 1 from the AIS receiver 9, the ECDIS 10, the plotter 11, the radar device 12, the sonar 13, etc. Although various information can be considered as the additional display information, the information may be, for example, about another ship 44 received by the AIS receiver 9 as illustrated in FIG. 3. Note that, the details of the additional display information will be described later.

The memory 18 of FIG. 1 may be configured as a memory which stores various kinds of information. The memory 18 may store three-dimensional shapes of virtual reality objects expressing various kinds of the additional display information as templates. Although the templates of the three-dimensional shapes stored in the memory 18 may be, for example, a small ship or boat, a large-sized ship or vessel, a buoy, a lighthouse, etc., they are not limited to these examples.

The imaging position setting module 25 may set the position of the camera 3 in the ship 4 (imaging position), specifically, the position of the camera 3 in the longitudinal direction and the width direction of the ship, and the position of the camera in the vertical direction (the height of the camera 3). Although the height of the camera 3 may be a height from a waterline normally assumed in the ship 4, it is not limited to this height and it may also be, for example, a height from the ship's bottom. This setup of the imaging position may be performed, for example, by the user operating the keyboard 31, the mouse 32, etc. to input the result of an actual measurement of the position of the camera 3.

The antenna position setting module 26 may set the position of the GNSS antenna in the ship 4 (antenna position). This antenna position may be, for example, positions in the longitudinal direction, the width direction, and the vertical direction of the ship with respect to a reference point 4a set in the ship 4 as a reference of control as illustrated in FIG. 2. Although this reference point 4a may be defined variously, it may be defined at a position at the center of the hull of the ship 4 and at the same height as the waterline normally assumed, in this embodiment. The setup of the antenna position may be performed, for example, by inputting an actual measurement value, similar to the imaging position described above.

The viewpoint setting module 27 of FIG. 1 may set the viewpoint of the image generated by the synthesized image generating module 20 (described later), for example, by the user operating the keyboard 31 and the mouse 32.

The display setting module 28 may set displaying or not-displaying of the additional display information in the image generated by the synthesized image generating module 20 (described later). Moreover, the display setting module 28 may set up whether various kinds of information for assisting understanding of the image, for example, a direction scale, a horizon, and sea surface grids, are displayed. These settings may be performed by the user operating the keyboard 31 and the mouse 32.

The position acquiring module 15, the posture acquiring module 16, the additional display information acquiring module 17, the memory 18, the imaging position setting module 25, the antenna position setting module 26, the viewpoint setting module 27, and the display setting module 28 may acquire, store or output the setting information to the synthesized image generating module 20.

The synthesized image generating module 20 may generate an image expressing extended reality by synthesizing three-dimensional computer graphics with the captured image of the camera 3 inputted into the captured image inputting module 21. This synthesized image generating module 20 may include a three-dimensional scene generating module 22 and the data synthesizing module 23.

Figure 4:
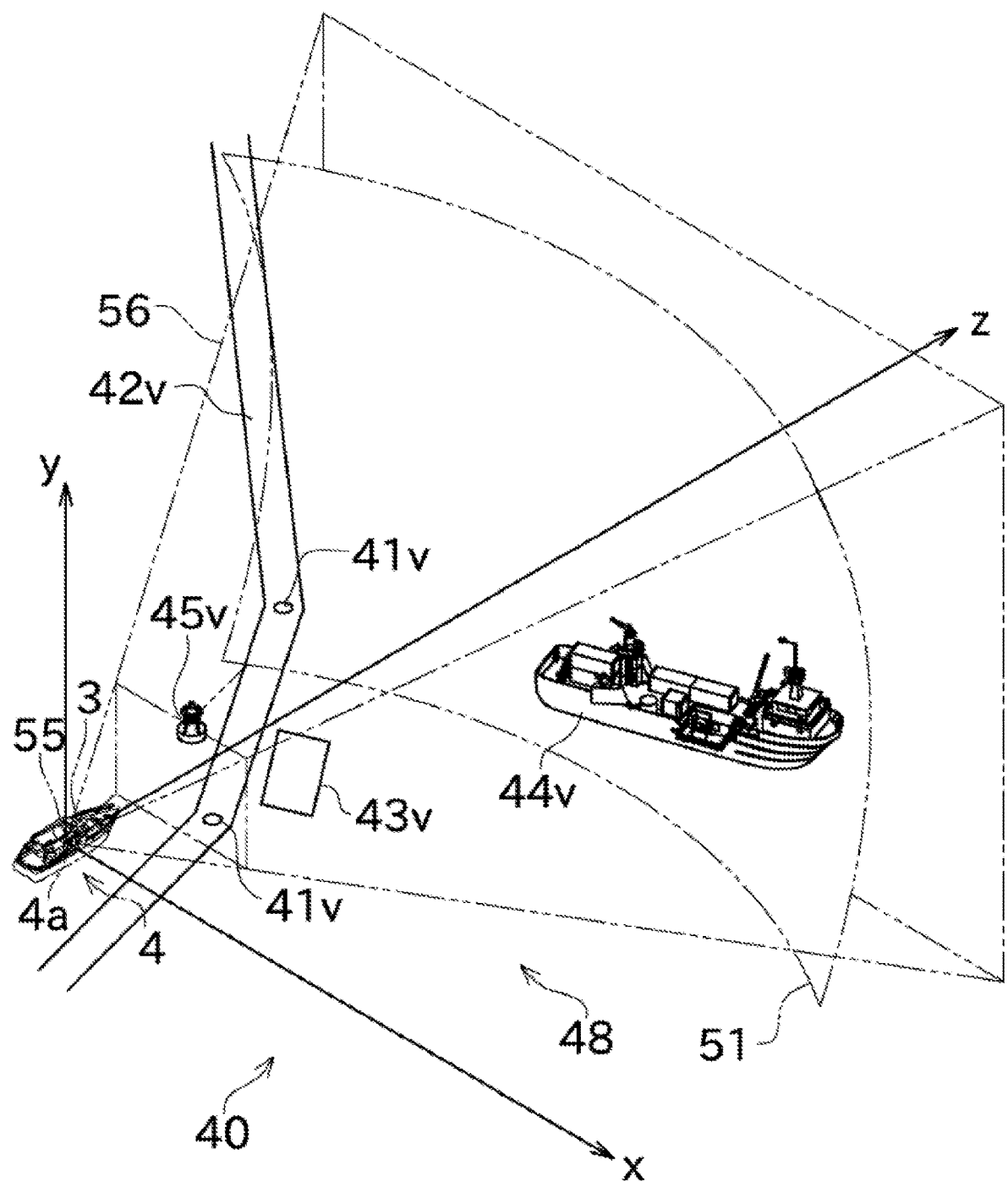
FIG. 4 is a conceptual diagram illustrating three-dimensional scene data established so that virtual reality objects are placed in a three-dimensional virtual space, and a projection screen placed in the three-dimensional virtual space.

As illustrated in FIG. 4, the three-dimensional scene generating module 22 may establish a three-dimensional scene of virtual reality by placing virtual reality objects 41v, 42v, . . . corresponding to the additional display information in a three-dimensional virtual space 40. Therefore, a three-dimensional scene data (three-dimensional display data) 48 which is data of the three-dimensional scene may be generated. Note that the details of the three-dimensional scene will be described later.

Figure 6:
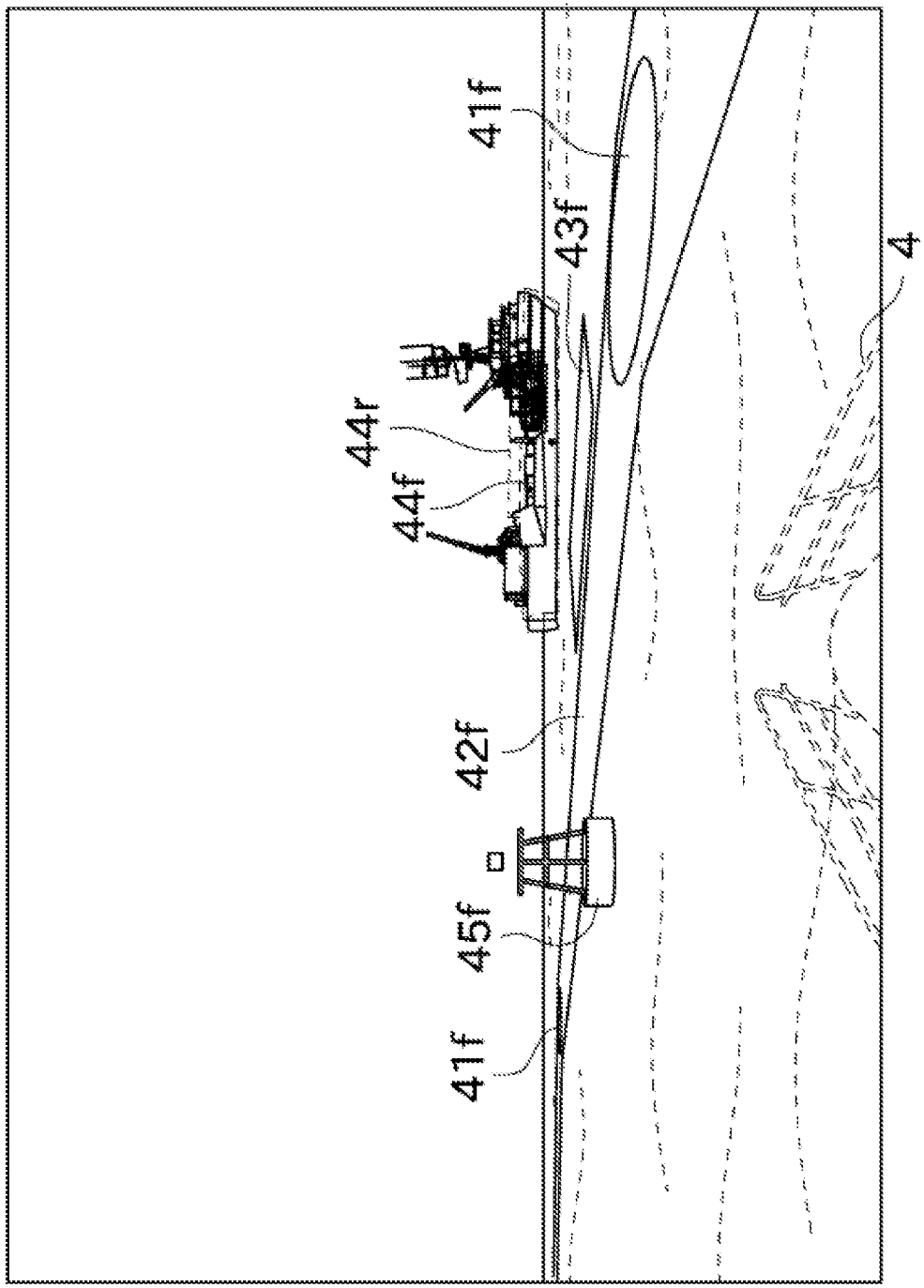
FIG. 6 is a view illustrating a synthesized image outputted from a data synthesizing module.

The data synthesizing module 23 of FIG. 1 may generate a graphic which three-dimensionally expresses the additional display information by rendering the three-dimensional scene data 48 generated by the three-dimensional scene generating module 22. The data synthesizing module 23 may also output a synthesized image as illustrated in FIG. 6, i.e., the image synthesized the graphics 41f, 42f, . . . with the captured image of the camera 3. As illustrated in FIG. 6, in this synthesized image, the graphics 41f, 42f, . . . indicative of the additional display information may be placed on a sea surface image captured by the camera 3 (illustrated in this figure by broken lines for convenience of description) in a superimposed fashion. The data synthesizing module 23 may output the generated synthesized image to the display unit 2. Note that the details of generation of the graphics and the data synthesizing will be described later.

Next, the additional display information described above acquired by the additional display information acquiring module 17 is described in detail. FIG. 3 is a conceptual diagram illustrating one example of the additional display information to be displayed in the image generating device 1.

The additional display information may be information displayed in addition to the image captured by the camera 3, and may be various items according to the purpose and the function of the ship instruments connected to the image generating device 1. For example, as for the AIS receiver 9, the received AIS information (e.g., the position and the direction of another ship, the position of a buoy, and the position of a virtual buoy) may be the additional display information. As for the ECDIS 10, the additional display information may be a position of a dangerous water area, a traveling prohibited area, a lighthouse, or a buoy contained in the electronic nautical chart. As for the plotter 11, the additional display information may be a position of a recorded trace of the ship 4, a scheduled route setting, a waypoint, an arrival area, and a stopping area. As for the radar device 12, the additional display information may be a position, a speed, etc. of a detected target object. As for the sonar 13, a position of a detected school of fish may be the additional display information. These information may be inputted on real time into the image generating device 1 from the ship instruments. The additional display information acquiring module 17 may assign identifying information (e.g., an identification number) for uniquely identifying and managing each of the inputted additional display information.

In FIG. 3, one example of the additional display information located around the ship 4 is illustrated. In FIG. 3, on the sea surface (on the water surface), waypoints 41 indicative of the destination, and a route line 42 in the shape of a polygonal line indicative of the scheduled route to the destination may be defined. Moreover, near the route line 42, a polygon-shaped (rectangular shape) stopping area 43 may be defined. The waypoint 41, the route line 42, and the stopping area 43 may be set by the user suitably operating the plotter 11 beforehand to specify the position of each location.

Moreover, in the example of FIG. 3, it may be detected using the AIS information acquired by the AIS receiver 9 that another ship 44 is traveling to the right of the ship 4 at a location a little distant forward from the ship 4, and a virtual buoy 45 is located near, forward and left side of the ship 4. Note that, although the virtual buoy is not actually provided on the sea due to situations, such as a difficulty of installation, it may mean an imaginary buoy (intangible) displayed as a label or marker in the screen of a navigation device.

Each additional display information may include information at least indicative of the position (latitude and longitude) of one or more locations on the sea surface (water surface) at which it is placed. For example, the additional display information indicative of the route line 42 includes information on positions of two locations used as bends of the polygonal line (the positions of the locations of the bends correspond to the positions of the waypoint 41). The additional display information on the stopping area 43 may include information at the position of each location used as a vertex of the polygon. Moreover, the additional display information indicative of another ship 44 may include information indicative of the position, the bow direction, the length and the width of another ship 44.

Next, the establishment of the three-dimensional scene by the three-dimensional scene generating module 22, and the synthesizing of the images by the data synthesizing module 23 are described in detail referring to FIG. 4. FIG. 4 is a conceptual diagram illustrating the three-dimensional scene data 48 which is generated by placing the virtual reality objects 41v, 42v, . . . on the three-dimensional virtual space 40, and a projection screen 51 placed on the three-dimensional virtual space 40.

As illustrated in FIG. 4, the three-dimensional virtual space 40 where virtual reality objects 41v, 42v, . . . are placed by the three-dimensional scene generating module 22 may be configured in a rectangular coordinate system which uses a suitable reference position of the ship 4 (e.g., the reference point 4a described above) as the origin, where an xz plane which is a horizontal plane imitates the sea surface (water surface). In the example of FIG. 4, the axis of coordinates may be set such that the +z direction is always in agreement with the bow direction, the +x direction is in agreement with the rightward, and the +y direction is in agreement with upward. Each location (coordinates) in the three-dimensional virtual space 40 may be set so as to correspond to the actual position around the ship 4.

In FIG. 4, one example where the virtual reality objects 41v, 42v, 43v, 44v, and 45v are placed in the three-dimensional virtual space 40, in order to express the situation around the ship 4 illustrated in FIG. 3, is illustrated. Each of the virtual reality objects 41v, 42v, 43v, 44v, and 45v may be placed so that it contacts the xz plane to reflect a relative position of the additional display information indicated by the virtual reality object with respect to the ship 4 on the basis of the bow direction of the ship 4. Upon determining the positions where these virtual reality objects 41v, 42v, . . . are placed, a calculation using the positions of the GNSS antennas set by the antenna position setting module 26 illustrated in FIG. 1 may be performed.

The virtual reality object 44v indicative of another ship 44 may have the shape of a ship, and may be expressed using a template of the model of a large-sized ship stored beforehand in the memory 18. Moreover, the direction of the model may be oriented so as to indicate the direction of another ship 44 acquired from the AIS information.

The virtual reality object 45v indicative of the virtual buoy 45 may be expressed using a template of the model of a buoy stored beforehand in the memory 18, similar to the virtual reality object 44v of another ship 44.

The virtual reality object 41v of the waypoint 41 may be expressed three-dimensionally in the shape of a thin disk. The virtual reality object 42v of the route line 42 may be expressed three-dimensionally in the shape of a polygonal line comprised of strip plates having a certain thickness and a certain width. The virtual reality object 43v of the stopping area 43 may be expressed three-dimensionally in the shape of a plate having a certain thickness and having a contour of the stopping area 43. For these virtual reality objects 41v, 42v, and 43v, the three-dimensional shapes may be created each time, without using the templates of the models.

The three-dimensional scene generating module 22 may generate the three-dimensional scene data 48 as described above. In the example of FIG. 4, since the virtual reality objects 41v, 42v, . . . are placed on the basis of azimuth from the position of the ship 4 as the origin, when the position of the ship 4 (positions in the east-and-west direction and the north-and-south direction) changes from the state of FIG. 3, or when the bow direction changes due to a turn etc., a new three-dimensional scene where the virtual reality objects 41v, 42v, . . . are rearranged may be established, and the three-dimensional scene data 48 may then be updated. Moreover, for example, when the contents of the additional display information are changed due to traveling of another ship 44 from the state of FIG. 3, the three-dimensional scene data 48 may be updated so that the latest additional display information is reflected.

Then, the data synthesizing module 23 may place in the three-dimensional virtual space 40 the projection screen 51 which defines the position and the area where the captured image of the camera 3 is projected. The synthesizing of the images can be realized by setting the position and the direction of a viewpoint camera 55 described below so that both the projection screen 51 and the virtual reality objects 41v, 42v, . . . are contained in the view of the camera 55.

The data synthesizing module 23 may simulate in the three-dimensional virtual space 40 the position and the direction of the camera 3 mounted on the ship 4, and place the projection screen 51 so as to directly oppose to the camera 3. For the simulation of the position of the camera 3, the position of the camera 3 on the basis of the hull can be obtained based on the setting value of the imaging position setting module 25 illustrated in FIG. 1.

Upon the simulation of the position and the direction of the camera 3, the change in the direction of the camera 3 by the pan/tilt operation described above may be taken into consideration. Further, the simulation may be performed so that the change in the position and the direction of the camera 3 due to the change in the posture and the height of the ship 4 are reflected based on the positional information and the posture information acquired by the position acquiring module 15 and the posture acquiring module 16. The data synthesizing module 23 may interlock with the change in the position and the direction of the camera 3 to change the position and the direction of the projection screen 51 placed in the three-dimensional virtual space 40.

Then, the data synthesizing module 23 may generate a two-dimensional image by performing known rendering to the three-dimensional scene data 48 and the projection screen 51. In more detail, the data synthesizing module 23 may place as the virtual camera, the viewpoint camera 55 in the three-dimensional virtual space 40, and define a frustum (visual cone) 56 which defines an area to be rendered so that the viewpoint camera 55 is used as a vertex and its line-of-sight direction becomes the center axis. Then, the data synthesizing module 23 may convert coordinates of a vertex of the polygon located inside the frustum 56 among the polygons which constitute each object (one of the virtual reality objects 41v, 42v, . . . , and the projection screen 51) into coordinates of the two-dimensional virtual screen corresponding to the display area of the synthesized image in the display unit 2 by a perspective projection. Then, based on the vertex placed on the virtual screen, a two-dimensional image may be generated by generating and processing pixels at a given resolution.

The two-dimensional image generated in this way may include graphics obtained by rendering the three-dimensional scene data 48 (in other words, the graphics as results of rendering the virtual reality objects 41v, 42v, . . . ). Moreover, during the generation of the two-dimensional image, the captured image of the camera 3 may be placed so as to be pasted at the position corresponding to the projection screen 51. Therefore, the synthesizing of the images by the data synthesizing module 23 may be realized. Since the projection screen 51 has a shape which is curved so as to meet the spherical shell centering on the camera 3, it can prevent distortion of the captured image by a perspective projection.

The viewpoint camera 55 may define the viewpoint of the synthesized image, and its position and direction may be defined by settings of the viewpoint setting module 27. However, by making a special setting in the viewpoint setting module 27, the data synthesizing module 23 may set a mode when generating the synthesized image as a mode in which the position and the direction of the viewpoint camera 55 change automatically so that they are always in agreement with the position and the direction of the camera 3 (viewpoint tracking mode). In this viewpoint tracking mode, since the entire view of the viewpoint camera 55 is always covered by the projection screen 51 (i.e., the captured image of the camera 3), the realistic synthesized image with presence can be realized.

On the other hand, the data synthesizing module 23 may also set the mode into a mode in which the position and the direction of the viewpoint camera 55 follows the viewpoint set in the viewpoint setting module 27 by a proper operation of an input device, regardless of the position and the direction of the camera 3 (independent viewpoint mode). The input device may include, for example, a keyboard 31, a mouse 32, a touch panel (not illustrated), a joy stick, etc. In this independent viewpoint mode, the user can move the viewpoint freely to confirm the additional display information at a position out of the imaging coverage of the camera 3.

Figure 5:
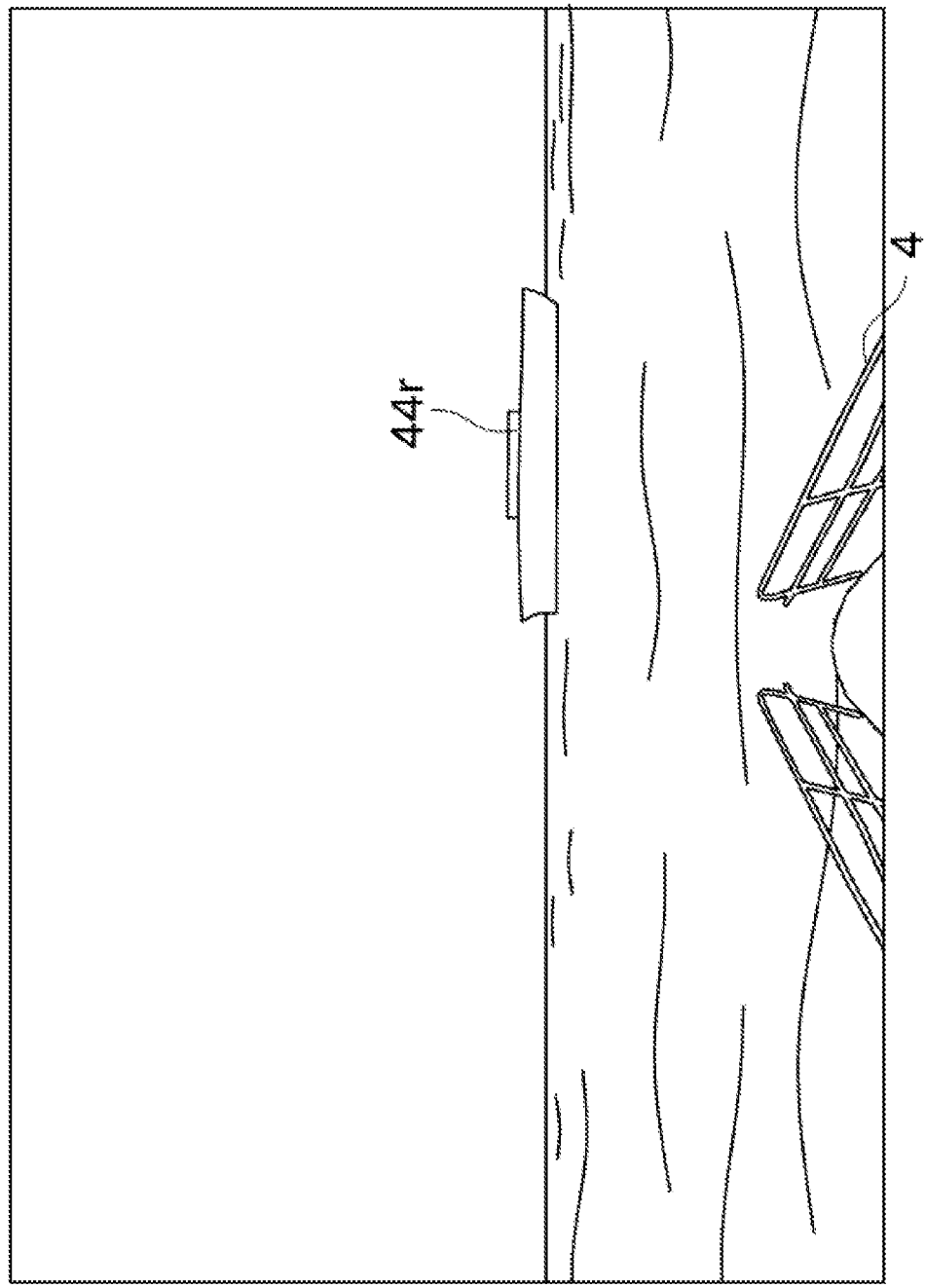
FIG. 5 is a view illustrating one example of a captured image by a camera.

Next, a relation between the image captured by the camera 3 and the synthesized image is described referring to one example. FIG. 5 is a view illustrating one example of the image captured by the camera 3. FIG. 6 is a view illustrating the synthesized image outputted from the data synthesizing module 23.

In FIG. 5, one example of the image captured by the camera 3 of the ship 4 in the situation indicated in FIG. 3 is illustrated. Another ship 44r floating on the sea surface is in the captured image. Moreover, a bow part of the ship 4 is located at the lower center of the image.

Since the virtual buoy 45 is virtual as described above, it will not be caught by the camera 3, as illustrated in FIG. 5. Since the waypoint 41, the route line 42, and the stopping area 43 are also created by the setup of the plotter 11, they will not appear in the image captured by the camera 3.

FIG. 6 illustrates a result of synthesizing the two-dimensional image obtained by rendering the three-dimensional scene data 48 in FIG. 4 with the captured image illustrated in FIG. 5. However, in FIG. 6, the parts which appear in the image captured by the camera 3 are illustrated by broken lines for convenience in order to facilitate the distinction from other parts (similar processing is also applied to other views indicating the synthesized image). In the synthesized image of FIG. 6, the captured image is placed so as to cover the screen entirely, and the graphics 41f, 42f, 43f, 44f, and 45f expressing the additional display information are placed so as to overlap with the captured image. The graphic 44f indicative of another ship is placed so as to substantially overlap with the position of another ship 44r in the captured image.

The graphics 41f, 42f, . . . may be generated as results of rendering the three-dimensional shapes of the virtual reality objects 41v, 42v, . . . which constitute the three-dimensional scene data 48 illustrated in FIG. 4, from the viewpoint at the same position and the direction as those of the camera 3. Therefore, even when the graphics 41f, 42f, . . . are superimposed with the realistic image captured by the camera 3, a visual disagreement may not substantially occur.

As illustrated in FIG. 6, the graphics 41f, 42f, . . . which express the additional display information in virtual reality may be placed on the synthesized image as if they are placed on the sea surface of the captured image. This may be realized by placing the virtual reality objects 41v, 42v, . . . illustrated in FIG. 4 so as to touch the xz plane located below the camera 3 by a distance calculated based on the height set by the imaging position setting module 25 (see FIG. 1), and correctly placing the position of the projection screen 51 in consideration of the position and the direction of the camera 3.

Figure 7:
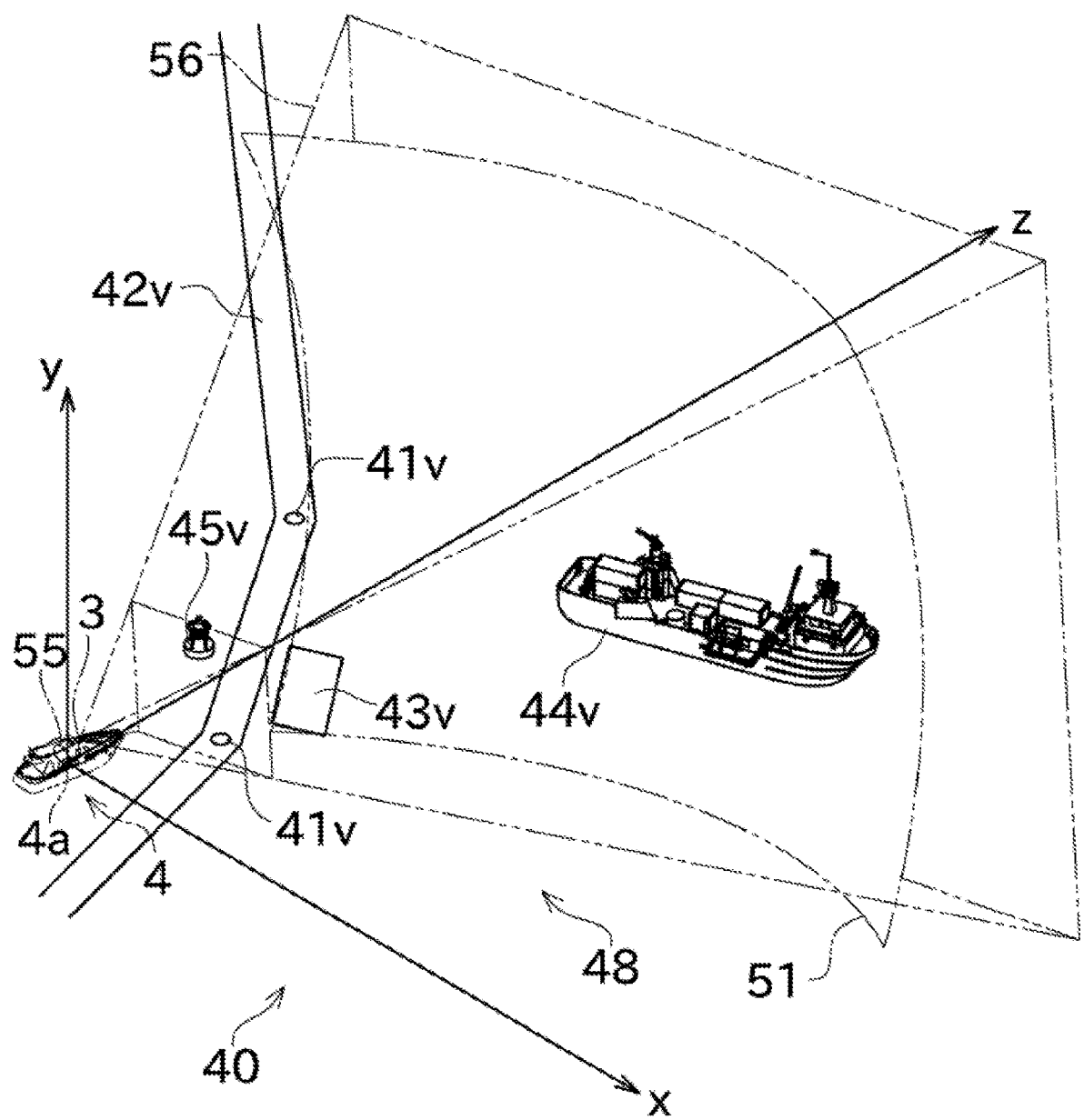
FIG. 7 is a conceptual diagram illustrating a case where the ship shakes in a pitch direction and a roll direction from the state of FIG. 4.
Figure 8:
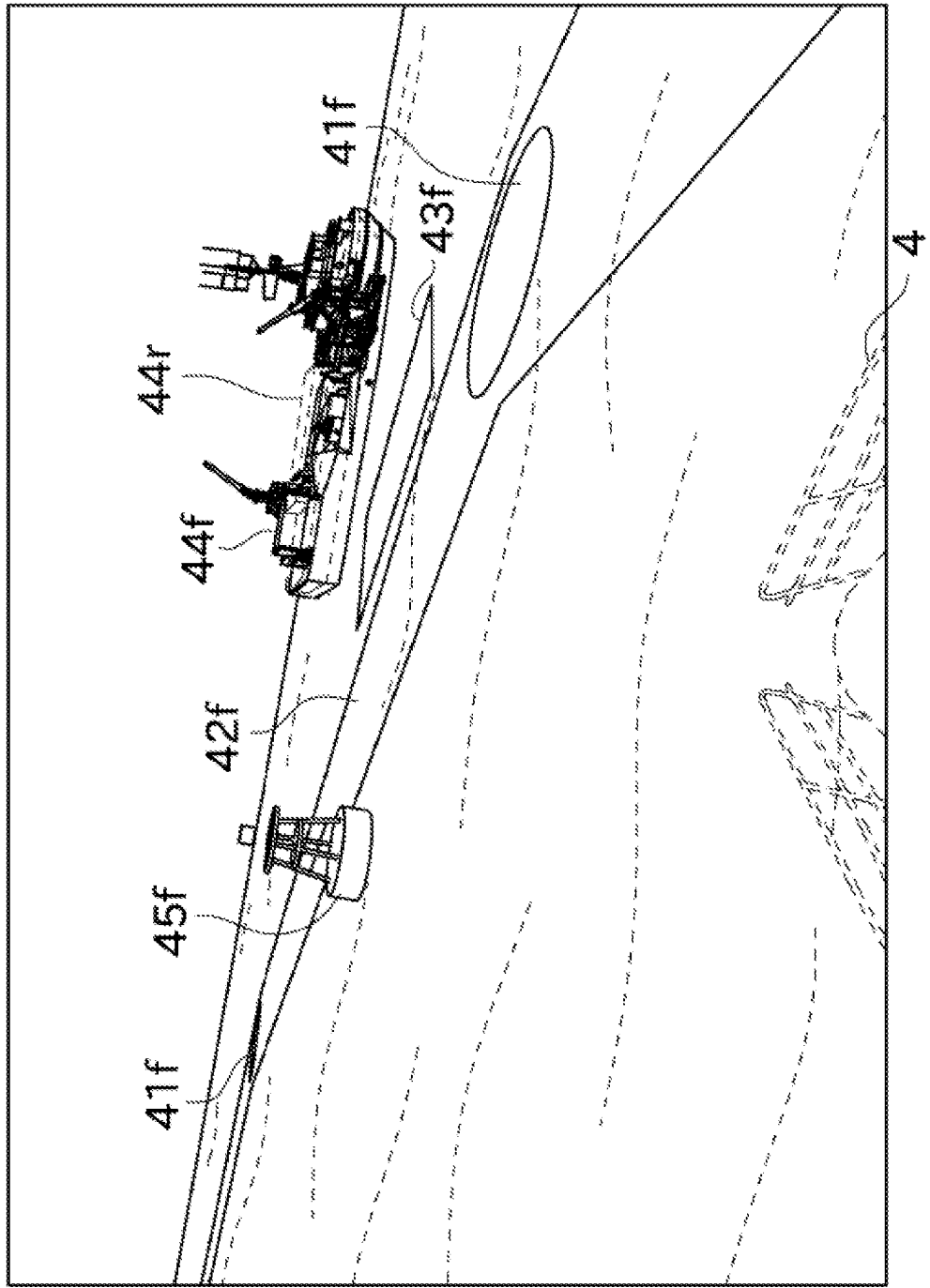
FIG. 8 is a view illustrating a synthesized image in the case of FIG. 7.

Next, a change in the synthesized image accompanying the shake of the ship 4 is described. FIG. 7 is a conceptual diagram illustrating a case where the ship 4 shakes in the pitch direction and the roll direction from the state of FIG. 4. FIG. 8 is a view illustrating the synthesized image in the case of FIG. 7.

As described above, since the camera 3 is attached to the ship 4, its position and direction may change in connection with the posture of the ship 4 inclining by a wave etc., or the ship 4 running over a wave. In this embodiment, when a shake (pitching, rolling and heaving) occurs on the ship 4, the data synthesizing module 23 may change the position and the direction of the camera 3 in the three-dimensional virtual space 40 so as to simulate a change in the posture of the ship 4 acquired by the posture acquiring module 16, and a change in the position of the ship 4 in the vertical direction acquired by the position acquiring module 15, and change the position of the projection screen 51 accordingly.

In FIG. 7, a situation when the posture of the ship 4 changes in the pitch direction and the roll direction from the state of FIG. 4 is illustrated. In the example of FIG. 7, the ship 4 inclines the bow downward and the port downward, and the position and the direction of the camera 3 change so as to reflect the inclination. The projection screen 51 interlockedly moves to directly oppose to the camera 3 of which the position and the direction changed.

In the example of FIG. 7, by the viewpoint tracking mode, the position and the direction of the viewpoint camera 55 also change so as to follow the camera 3 of which the position and the direction changed as described above. One example of the synthesized image corresponding to FIG. 7 is illustrated in FIG. 8, and as illustrated in this figure, even if the position and the direction of the camera 3 change in connection with the shake of the ship 4, since the position and the direction of the projection screen 51 interlockedly change, and the position and the direction of the viewpoint camera 55 which renders the three-dimensional scene change, a comfortable synthesized image can be continuously obtained.

In the viewpoint tracking mode, each time the pitch angle or the roll angle changes more than a given value with the shakes of the ship 4, the rendering of the three-dimensional scene data 48 may be updated by the data synthesizing module 23, and, therefore, the graphics 41f, 42f, . . . based on the latest viewpoint may be generated. Accordingly, the display of the graphics 41f, 42f, . . . can be changed appropriately to maintain a state where they are placed on the sea surface, while the direction in which the sea surface appears change in the captured image of the camera 3 with the shakes of the ship 4.

Therefore, the extended-reality image in which the imaginary objects can be seen as if they are floating on the sea surface, and which is natural and high in the actual feeling can be obtained. Moreover, by the user looking at the sea surface projected on the display unit 2, since the graphics 41f, 42f, . . . indicating the virtual reality come into the user's field of view comprehensively, he/she can acquire every piece of necessary information.

Figure 9:
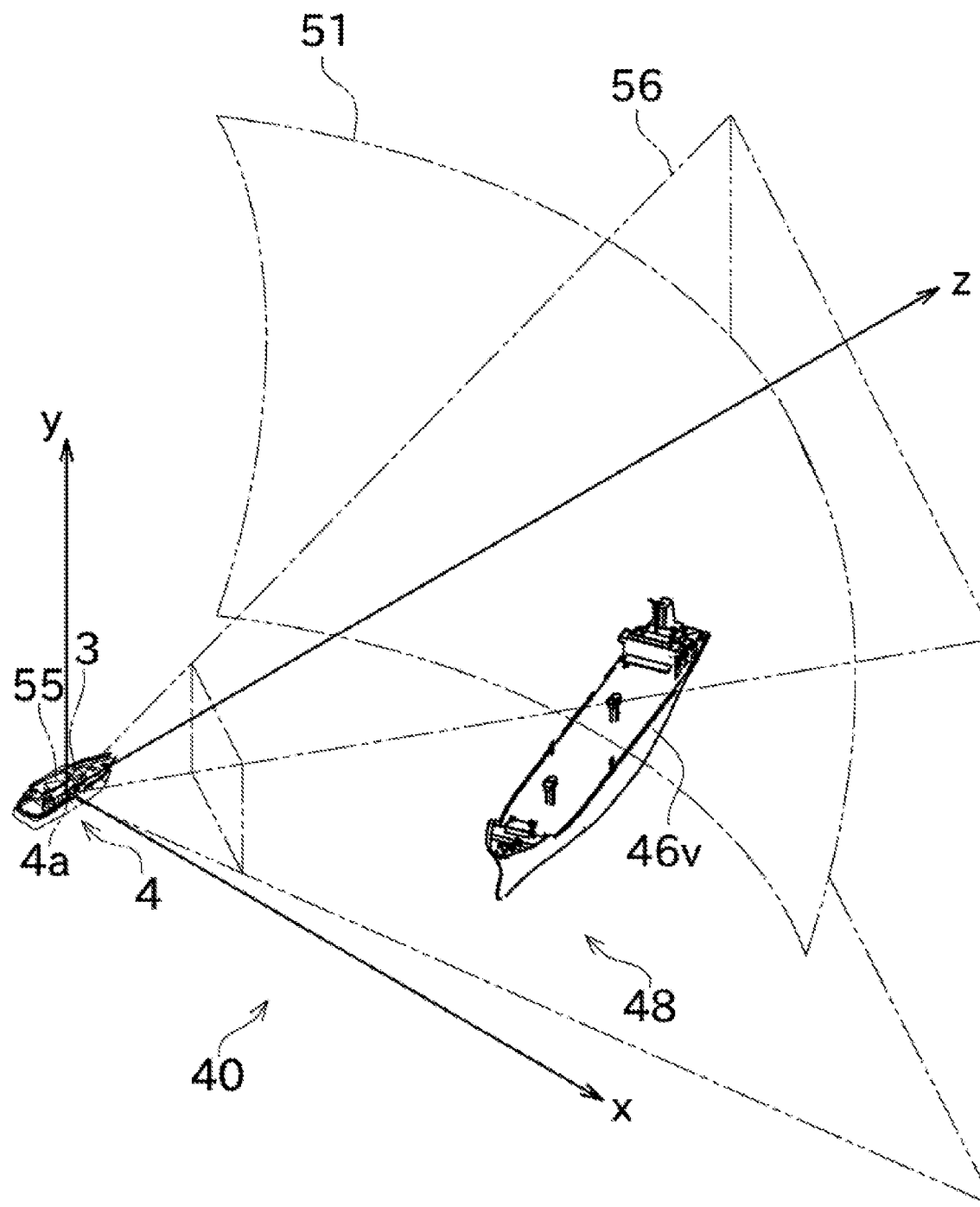
FIG. 9 is a conceptual diagram illustrating a case where a viewpoint camera which defines a viewpoint of the synthesized image is panned to the right of the imaging direction of a camera provided to the ship.
Figure 10:
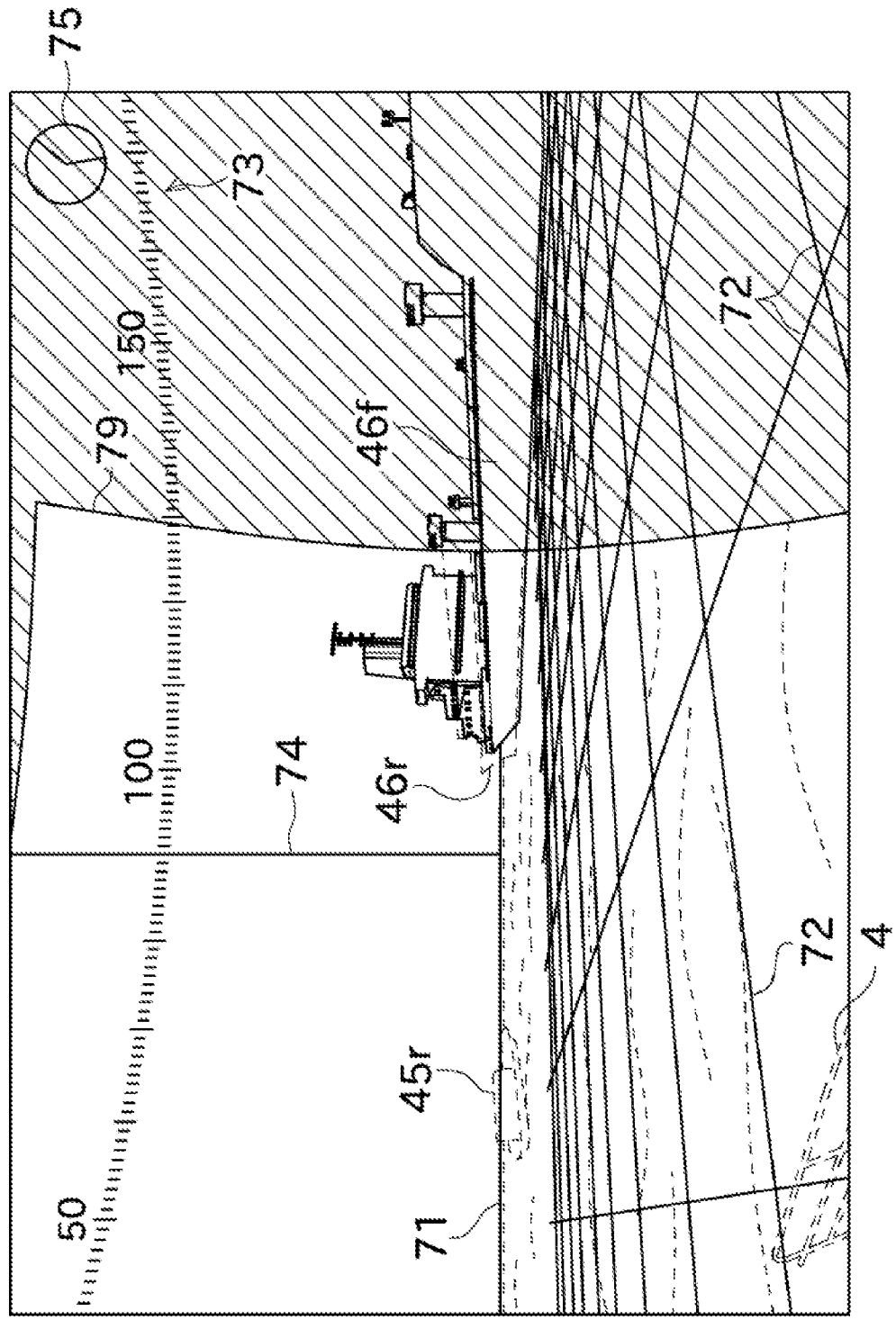
FIG. 10 is a view illustrating a case where the captured image of the camera occupies a part of the synthesized image.
Figure 11:
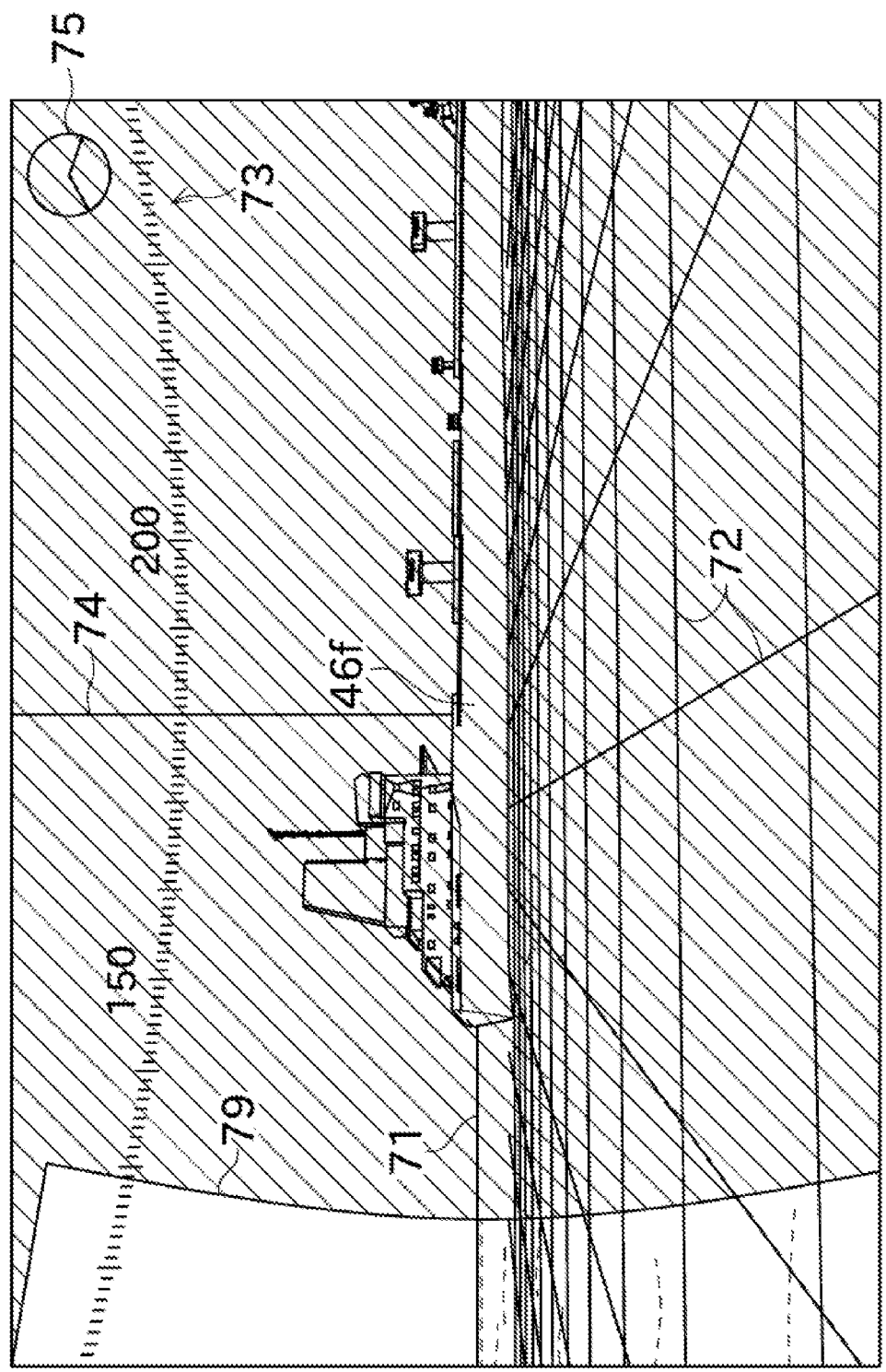
FIG. 11 is a view illustrating the synthesized image when panning the viewpoint camera further to the right from the state of FIG. 10.
Figure 12:
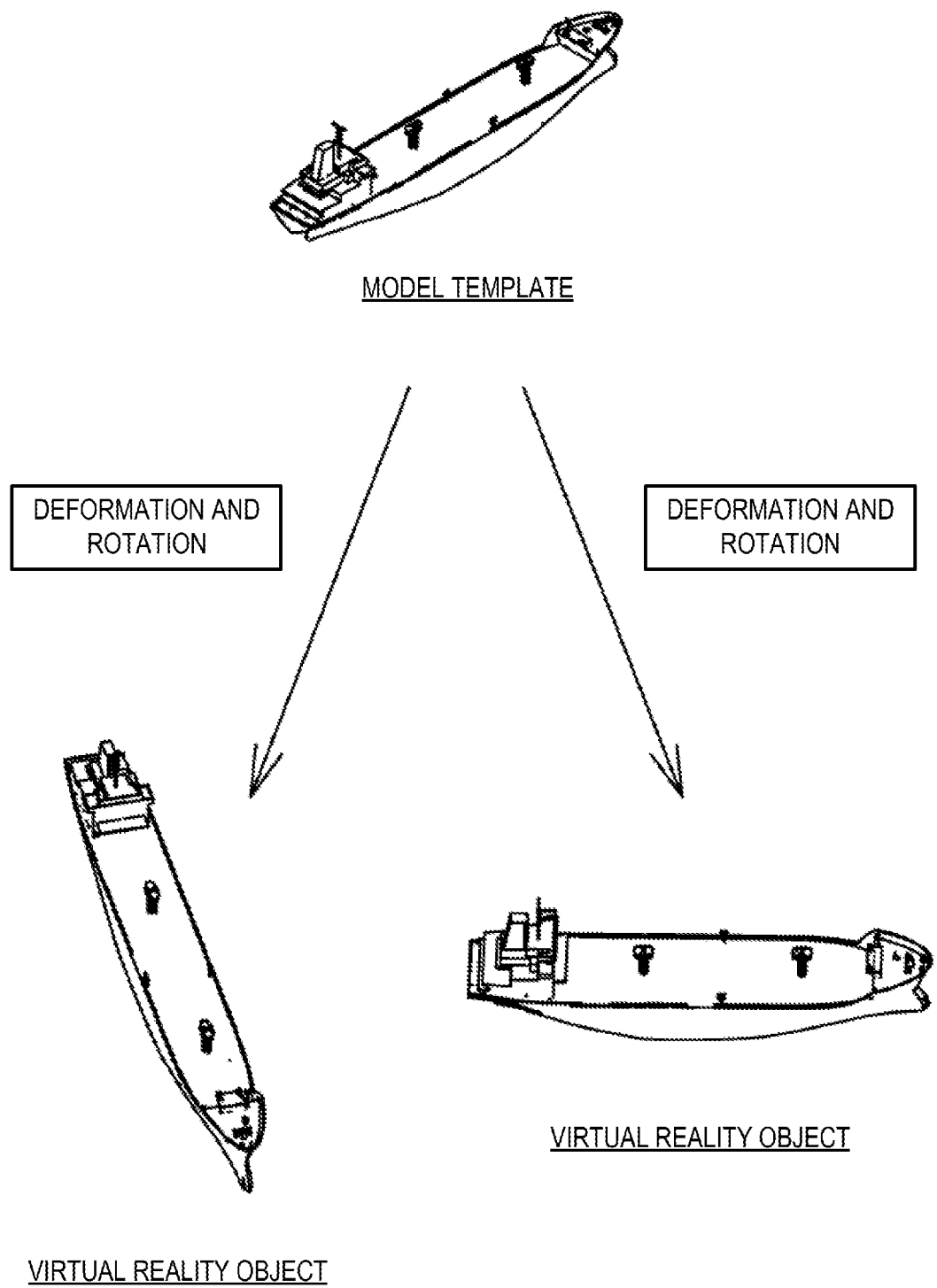
FIG. 12 is a view illustrating processing to generate a plurality of virtual reality objects of different shapes and directions by deformation and rotation of a template of a three-dimensional model.

Next, a case where the image captured by the camera 3 is placed in a part of a synthesized image area in the synthesized image is described. FIG. 9 is a conceptual diagram illustrating a case where the viewpoint camera 55 which defines the viewpoint of the synthesized image is panned to the right of the imaging direction of the camera 3 provided to the ship 4. FIG. 10 is a view illustrating a case where the captured image of the camera 3 occupies a part of the synthesized image. FIG. 11 is a view illustrating the synthesized image when the viewpoint camera 55 is panned further to the right from the state of FIG. 10. Note that, in FIGS. 10 and 11, an area where the captured image is not placed (an area where only the three-dimensional graphics are placed) among all the areas of the synthesized image is illustrated with hatching for convenience of illustration.

In the independent viewpoint mode described above, the viewpoint setting module 27 may define the position and the direction of the viewpoint camera 55 independently from the position and the direction of the camera 3. Therefore, the user may confirm on the display unit 2 the additional display information which is located in a direction greatly different from the direction of the camera 3.

In FIG. 9, the three-dimensional virtual space 40 when the viewpoint camera 55 of the synthesized image is directed to an obliquely right direction which is different from the direction of the camera 3 (forward of the ship 4) is illustrated. Since the projection screen 51 to which the captured image of the camera 3 is pasted is placed forward of the ship 4 corresponding to the direction of the camera 3, only a part of the projection screen 51 may be fallen within the field of view of the viewpoint camera 55 defined by the visual cone 56.

The synthesized image corresponding to FIG. 9 is illustrated in FIG. 10, and in this synthesized image, the captured image may be placed only in the left-side part of the synthesized image so that the captured image is partially viewed. That is, the synthesized image may have an area with the captured image and an area without the captured image. Since the projection screen 51 described above is curved in the shape of a spherical shell, a boundary of the captured image may be appeared to be curved as illustrated in FIG. 11. In the area without the captured image, a black background may be displayed, for example.

A small boat 45r floating on the sea surface may appear in the captured image, and only the stern part of a large-sized vessel 46r may appear.

Since the small boat 45r does not transmit the AIS information, the image generating device 1 may not acquire the additional display information. Therefore, since the virtual reality object is not placed in the three-dimensional virtual space 40 of FIG. 10 for the small boat 45r, the graphic indicative of the additional display information may not displayed in the synthesized image. The graphic indicative of the additional display information may also be displayed at this part, for example, by detecting the small boat 45r with the radar device 12.

For the large-sized vessel 46r, a virtual reality object 46v having the shape of a vessel may be placed in the three-dimensional virtual space 40 based on the AIS information, and the graphic 46f rendering the object may be displayed in the synthesized image.

In the example of FIG. 10, the graphic 46f of the large-sized vessel may be rendered on the both sides of the boundary of the captured image. Therefore, the user may grasp another ship located around the ship by the graphic 46f, while viewing both the part with the captured image (extended reality part) and the part without the captured image (virtual reality part) simultaneously. Therefore, also for direction different from the imaging direction of the camera 3, the user can confirm the situation around his/her ship (the existence of the target object(s) etc.), and can monitor throughout the wide range.

Moreover, even for another ship 46r which is only partially in the captured image, the position, the size, etc. of another ship may appropriately be expressed by the graphic 46f rendered so that it is partially located outside the captured image.

In the example of FIG. 10, in order to emphasize the boundary between the area with the captured image and the area without the captured image, a boundary line 79 may further be synthesized with the image. However, the display setting module 28 illustrated in FIG. 1 may variously set how the boundary is expressed. For example, it is possible to further emphasize the boundary by displaying the boundary line by a double line. Alternatively, it is possible not to emphasize the boundary by not displaying the boundary line 79 to make the edge of the captured image obscure. Thus, when the edge is obscured, the extended reality area and the virtual reality area can be expressed so that they are smoothly connected.

Next, various kinds of information further displayed in order to facilitate understanding of the synthesized image are described.

In the image of FIG. 10, a direction scale 73 which is formed in an arc connecting the left end and the right end of the image may be synthesized. The direction scale 73 may be placed on both the area with the captured image and the area without the captured image. Therefore, even when the synthesized image of any direction is outputted, the user can easily acquire the information on the direction. The direction scale 73 may be displayed at the front most side so that it is not hidden by other indications (e.g., the virtual reality object(s)). Therefore, the user can certainly grasp the information on the direction which is important information for performing the steering etc. of the ship.

Further, in the image of FIG. 10, a straight line 71 indicative of a horizon (a boundary between the sea surface and sky) and a grid 72 indicative of the sea surface may be placed in both the area with the captured image and the area without the captured image. Therefore, the user can easily grasp the horizon and the sea surface.

In addition, in the image of FIG. 10, a directional line 74 indicative of a particular direction (e.g., north, west, etc.) may be placed so as to extend in the vertical direction of the synthesized image. Therefore, the user can easily grasp the particular direction.

Moreover, in the upper right corner of the image of FIG. 10, a field-of-view indicator graphic 75 schematically indicating a range which is projected on this synthesized image among all the directions of the ship 4 may be displayed. This field-of-view indicator graphic 75 may be a graphic in which a circle and a fan are overlapped, and a direction and a central angle of the fan shape indicate the current direction and viewing angle of the viewpoint camera 55 (substantially, a direction and viewing angle corresponding to the synthesized image displayed on the display unit 2). The direction of the fan shape may be displayed so that, for example, north becomes upward. For example, the direction of the fan shape changes on real time as the user changes the direction of the viewpoint camera 55. By seeing this, the user can intuitively grasp which direction of the image he/she sees. The field-of-view indicator graphic 75 may be configured to express the direction and the viewing angle of the camera 3 which acquires the captured image by a fan shape, alternatively or additionally to expressing the view of the viewpoint camera 55 by the fan shape.

However, the direction scale 73, the horizon straight line 71, the sea surface grid 72, the directional line 74, and the field-of-view indicator graphic 75 may be set individually by the display setting module 28 so as not to be displayed. For example, in the synthesized image of FIG. 6, the direction scale 73, the sea surface grid 72, etc. are not displayed.

Next, processing according to the shake of the ship 4 in the independent viewpoint mode is described.

As described above, in the independent viewpoint mode, the position and the direction of the viewpoint camera 55 may differ from the position and the direction of the camera 3. However, also in the independent viewpoint mode, when the captured image of the camera 3 is placed so as to cover the entire synthesized image, or when the captured image occupies partially, but, for example, a certain amount of the synthesized image as illustrated in FIG. 10, it may be suitable to change the position and the direction of the graphic 46f corresponding to the change in the captured image according to the shake of the ship 4, in order to prevent a positional offset of the graphic 46f etc. from the captured image. Thus, in the above case, the data synthesizing module 23 may perform processing to change the position and the direction of the viewpoint camera 55 so as to follow the change in the posture of the camera 3 in the roll direction of the camera 3 (a roll direction centering on the imaging optical axis) due to the shake of the ship 4 (a shake tracking as a posture change following processing). Note that the shake tracking may be performed, for example, corresponding to the change in the posture of the camera 3 in the pitch direction, as well as the change in the roll direction. Moreover, the shake tracking may be performed corresponding to the heaving of the camera 3.

On the other hand, when the occupancy of the captured image in the synthesized image is small as illustrated in FIG. 11, or when the captured image is not contained in the synthesized image at all, the data synthesizing module 23 may not perform the shake tracking. Therefore, the shake of the image can be prevented to realize the stable and easy-to-view indication.

Next, a special case of the independent viewpoint mode is described.

The viewpoint setting module 27 may be configured to be capable of instructing an attention mode, for example, by the user operating the mouse 32 and specifying an arbitrary point on the sea surface in the synthesized image. In this attention mode, the data synthesizing module 23 may automatically change the imaging direction of the viewpoint camera 55 so that the position on the three-dimensional virtual space 40 corresponding to the specified point is continuously displayed on a given position in the synthesized image (e.g., the center of the image). Moreover, when the graphic of the virtual reality object (e.g., the graphic 46f) is located at the point specified by the user, the imaging direction of the viewpoint camera 55 may automatically be changed so that the graphic 46f rendering the virtual reality object 46v is continuously displayed at the given position in the synthesized image (e.g., the center of the image).

Therefore, the specific point or the specific virtual reality object can be continuously monitored in the synthesized image. Thus, the image generating device 1 of this embodiment can be broadly utilized not only in the case where the perimeter of the ship 4 is desired to be monitored comprehensively, but also in the case where the behavior etc. of a specific monitoring object (another ship etc.) is desired to be selectively monitored in a narrowed-down manner.

Next, processing to generate the virtual reality object of another ship (e.g., the virtual reality object 46v of FIG. 9) by the three-dimensional scene generation module 22 is described.

In this embodiment, the AIS information on another ship may be acquired as the additional display information, and when the three-dimensional scene generation module 22 places the virtual reality object of the shape of a ship in the three-dimensional virtual space 40, the three-dimensional scene generation module 22 may read a model (model template) which becomes the basis of the three-dimensional shape of the ship from the memory 18. Then, the three-dimensional scene generation module 22 may generate the virtual reality object by performing an expansion/contraction deformation of the length, an expansion/contraction deformation of the width, and a rotation of the ship so that the model which becomes the basis realizes the AIS information (the length, the width, and the bow direction of the ship).

Therefore, the three-dimensional scene generation module 22 may generate the three-dimensional scene data 48 by placing in the three-dimensional virtual space 40 the virtual reality object having the shape of a ship of which the length, the width, and the bow direction match with the additional display information. Therefore, the image of the extended reality to which the information on another ship is more appropriately reflected can be obtained.

However, any of the expansion/contraction deformation of the length, the expansion/contraction deformation of the width, and the rotation may be omitted. For example, when the information on another ship detected by the radar device 12 is acquired as the additional display information, it is possible to generate the virtual reality object of another ship by rotating the model template so that the bow direction becomes in agreement with the velocity vector of another ship. Of course, when the shape of the echo signal is acquired by the radar device 12, the expansion/contraction deformation of the model template may also be carried out so as to realize the shape of the echo signal.

As described above, the image generating device 1 of this embodiment may include the captured image inputting module 21, the position acquiring module 15, the posture acquiring module 16, the additional display information acquiring module 17, and the synthetic image generating module 20. The captured image inputting module 21 may accept the input of the captured image captured by the camera 3 installed in the ship 4. The position acquiring module 15 may acquire the positional information indicative of the position of the ship 4. The posture acquiring module 16 may acquire the posture information indicative of the posture of the ship 4. The additional display information acquiring module 17 may acquire the additional display information including the information indicative of the positions of one or more locations. The synthetic image generating module 20 may generate the synthesized image in which the graphics 41f, 42f, . . . rendering the three-dimensional virtual reality objects 41v, 42v, . . . indicative of the additional display information are synthesized with the image captured by the camera 3, based on the positional information, the posture information, and the additional display information. The synthetic image generating module 20 can place the graphic 46f so as to cross or traverse the boundary of the captured image, when the captured image is partially placed in the synthesized image, as illustrated in FIG. 10.

Therefore, the virtual reality indication can be realized by creating the synthesized image so that the graphics 41f, 42f, . . . indicative of the positions etc. of the additional display information are superimposed on the captured image based on the position and the posture of the ship 4. Moreover, for example, since the additional display information in a direction different from the imaging direction of the camera 3 can be confirmed by the graphic 46f, the user can confirm the additional display information in a wide range of direction. Further, since the graphic 46f can be placed across both the area with the captured image and the area without the captured image, the user can grasp the situation indicated by the additional display information, while seamlessly viewing both the part where the captured image is placed and the other part.

Moreover, in the image generating device 1 of this embodiment, the synthesized image generating module 20 can synthesize the graphic 46f rendering the virtual reality object 46v having the shape of a ship with the image captured by the camera 3.

Therefore, even when the another ship 46r partially appears in the captured image, the user can easily understand the position, the size, etc. of another ship 46r by the graphic 46f rendering the virtual reality object 46v so that the object extends out of the captured image.

Moreover, in the image generating device 1 of this embodiment, the synthesized image generating module 20 can synthesize the graphic 46f rendering the virtual reality object 46v of which the length, the width, and the bow direction of another ship reflect the additional display information, with the image captured by the camera 3.

Therefore, since the object of the ship has the shape and the direction based on the additional display information, the synthesized image which more faithfully reflects the additional di splay information can be obtained.

Moreover, in the image generating device 1 of this embodiment, the synthesized image generating module 20 can synthesize the direction scale 73 indicative of the direction with the image captured by the camera 3. When the captured image of the camera 3 is partially placed in the synthesized image, the synthetic image generating module 20 can place the direction scale 73 across the boundary of the captured image.

Therefore, the user can easily grasp the direction, while seamlessly viewing both the area with the captured image and the area without the captured image.

Moreover, in the image generating device 1 of this embodiment, the synthetic image generating module 20 can synthesize the straight line 71 indicative of the horizon which is a boundary between a sea surface and sky with the image captured by the camera 3. When the captured image of the camera 3 is partially placed in the synthesized image, the synthetic image generating module 20 can place the horizon (straight line 71) across the boundary of the captured image.

Therefore, the user can easily grasp the horizon, while seamlessly viewing both the area with the captured image and the area without the captured image.

Moreover, in the image generating device 1 of this embodiment, the synthetic image generating module 20 can synthesize the grid 72 indicative of a sea surface with the image captured by the camera 3. When the captured image of the camera 3 is partially placed in the synthesized image, the synthetic image generating module 20 can place the grid 72 across the boundary of the captured image.

Therefore, the user can easily grasp the sea surface, while seamlessly viewing both the area with the captured image and the area without the captured image.

Moreover, in the image generating device 1 of this embodiment, the synthetic image generating module 20 can obscurely or emphasizedly render the boundary of the image captured by the camera 3.

Therefore, since the impression of the boundary of the captured image can be weakened or strengthened, the design of the indication can be improved.

Moreover, in the image generating device 1, when the captured image of the camera 3 is placed in the entire synthesized image, the synthetic image generating module 20 may perform the shake tracking in which the position and the direction of the virtual reality object 46v being rendered is changed corresponding to at least the posture change in the roll direction with respect to the imaging optical axis of the camera 3. The synthetic image generating module 20 may not perform the shake tracking when the captured image of the camera 3 is not placed in the entire synthesized image.

Therefore, when the captured image is placed so as to cover the entire synthesized image, since the position and the direction of the virtual reality objects 41v, 42v, . . . being rendered are changed corresponding to the change in the posture of the camera 3 due to the shake of the ship 4 by a wave etc., the unnatural appearance of the synthesized image can be reduced, and the presence can be improved. On the other hand, when the captured image is not contained in the synthesized image at all, the shake of the image can be prevented.

Moreover, in the image generating device 1 of this embodiment, the synthetic image generating module 20 may place at least some of the additional display information in the three-dimensional virtual space 40 as the three-dimensional virtual reality objects 41v, 42v, . . . based on the positional information and the posture information, and place the projection screen 51 to which the image captured by the camera 3 is pasted, and render the virtual reality objects 41v, 42v, . . . and the captured image based on the position and the direction of the viewpoint camera 55 placed in the three-dimensional virtual space, to generate the synthesized image data. Moreover, the image generating device 1 can change the position and the direction of the viewpoint camera 55 by the user's operation.

Therefore, the additional display information can be confirmed in various directions from the ship 4. Moreover, even if the direction in which the user wants to see changes, the synthesized image can be realized with the simple processing, while maintaining the consistency of the three-dimensional appearance of the graphics 41f, 42f, . . . which are the three-dimensional expressions of the additional display information and the captured image of the camera 3.

Moreover, in the image generating device 1 of this embodiment, the synthetic image generating module 20 can automatically change the position and the direction of the viewpoint camera 55 so that the point in the three-dimensional virtual space 40, or the point of the virtual reality object (41v, 42v, . . . ) specified by the user, or the virtual reality object (41v, 42v, . . . ) continuously appears in the synthesized image.

Therefore, it may become easy for the user to continuously confirm the situation at the location of user's interest or the situation indicated by the additional display information.

Although the suitable embodiment of the present disclosure is described above, the above configuration may be changed for example as follows.

In the above embodiment, the viewpoint setting module 27 may be configured so that the user can instruct both the position and the direction of the viewpoint camera 55. However, alternatively, it may be configured so that only the position or only the direction of the viewpoint camera 55 may be instructed.

The data synthesizing module 23 may be configured so that the three-dimensional scene data 48 and the projection screen 51 may not be rendered simultaneously. That is, the data synthesizing module 23 may be configured to create separately the two-dimensional images which are rendering results of only the three-dimensional scene data 48 (the images of the graphics 41f, 42f, . . . ), and the two-dimensional image which is a rendering result of only the projection screen 51 (the image in which the captured image is pasted on the projection screen 51), and then synthesize the two-dimensional images. In this case, while performing the rendering of the three-dimensional scene data 48 as needed according to the movement etc. of the ship 4, the rendering of the projection screen 51 can be performed at a short time interval according to the frame rate of the image captured by the camera 3.

In the camera 3, the pan/tilt function described above may be omitted, and the imaging direction may be fixed, for example, to forward. Moreover, the camera 3 may be installed so as to image a direction other than the forward (e.g., rearward).

When the user changes the direction of the viewpoint camera 55, the pan/tilt operation of the camera 3 may be automatically performed so as to follow the change in the direction. Also in this case, for example, when the pan operation of the camera 3 cannot catch up with the change in the direction of the viewpoint camera 55, the captured image of the camera 3 may temporarily be partially visible in the synthesized image, as illustrated in FIGS. 10 and 11.

Upon generating the three-dimensional scene data 48 by the three-dimensional scene generating module 22, the virtual reality objects 41v, 42v, . . . may be placed on the basis of the bow direction using the position of the ship 4 as the origin in the above embodiment, as illustrated in FIG. 4. However, the virtual reality objects 41v, 42v, . . . may be placed on the basis of north in which the +z direction always points north, without the bow direction. In this case, when the bow direction of the ship 4 changes due to a turn etc., the direction of the ship 4 in the three-dimensional virtual space 40 may be changed to the yaw direction, instead of rearranging the virtual reality objects 41v, 42v, . . . . Then, the changes in the position and the direction of the camera 3 at this time may be simulated in the three-dimensional virtual space 40, and a rendering may be performed in the interlocking manner while changing the position and the direction of the viewpoint camera 55, thereby obtaining the completely same rendering result as the case of the bow direction basis.

Alternatively, the coordinate system of the three-dimensional virtual space 40 may be defined so that a fixed point suitably defined on the earth is used as the origin, and, for example, the +z direction serves as north and the +x direction serves as east, instead of using the position of the ship 4 as the origin. In this case, in the three-dimensional virtual space 40 of the coordinate system fixed to the earth, the position and the direction of the ship 4 may change based on the positional information and the posture information, and the change in the position and the direction of the camera 3 accompanying the change may be simulated in the three-dimensional virtual space 40.

In the image generating device 1, a shake of the synthesized image accompanying the shake of the ship 4 may be reduced. For example, the three-dimensional scene generating module 22 may reduce the change in the position and the direction of the viewpoint camera 55, even when the ship 4 shakes.

The form of the straight line 71 indicative of the horizon and the grid 72 indicative of the sea surface illustrated in the above embodiment are merely illustration, and they may also be indicated in other forms. For example, the straight line 71 and the grid 72 may be indicated to be transparent and visible on the other side of the graphic 46f rendering the virtual reality object 46v.

The ship instruments (information source of the additional display information) connected to the image generating device 1 are not limited to what is described in FIG. 1, and other ship instruments may be included.

The present disclosure is applicable not only to the ship which travels on the sea, but may also be applicable to arbitrary water-surface movable bodies which can travel, for example, the sea, a lake, or a river.

Figure 13:
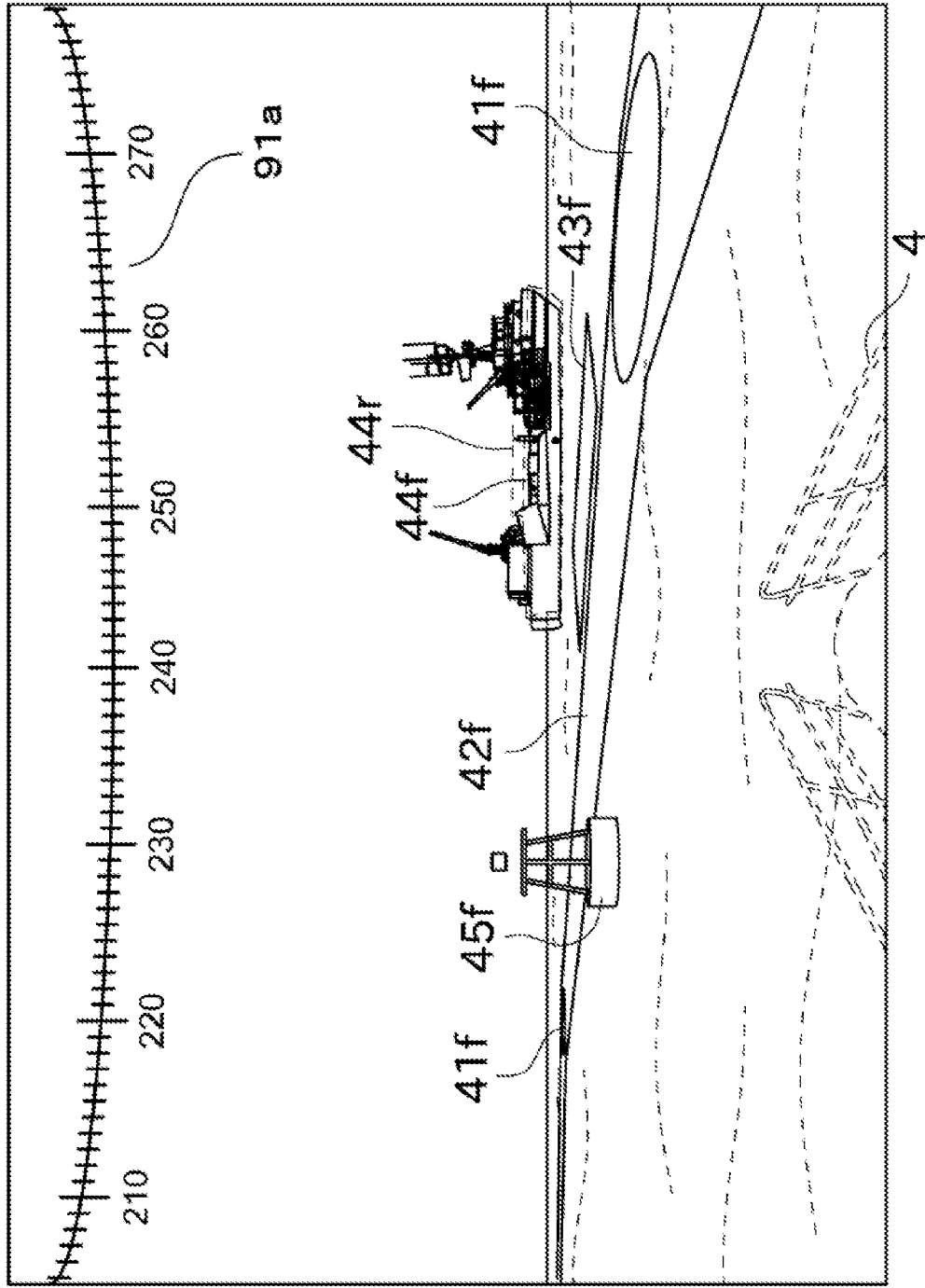
FIG. 13 is Display Example 1 of a direction scale.
Figure 14:
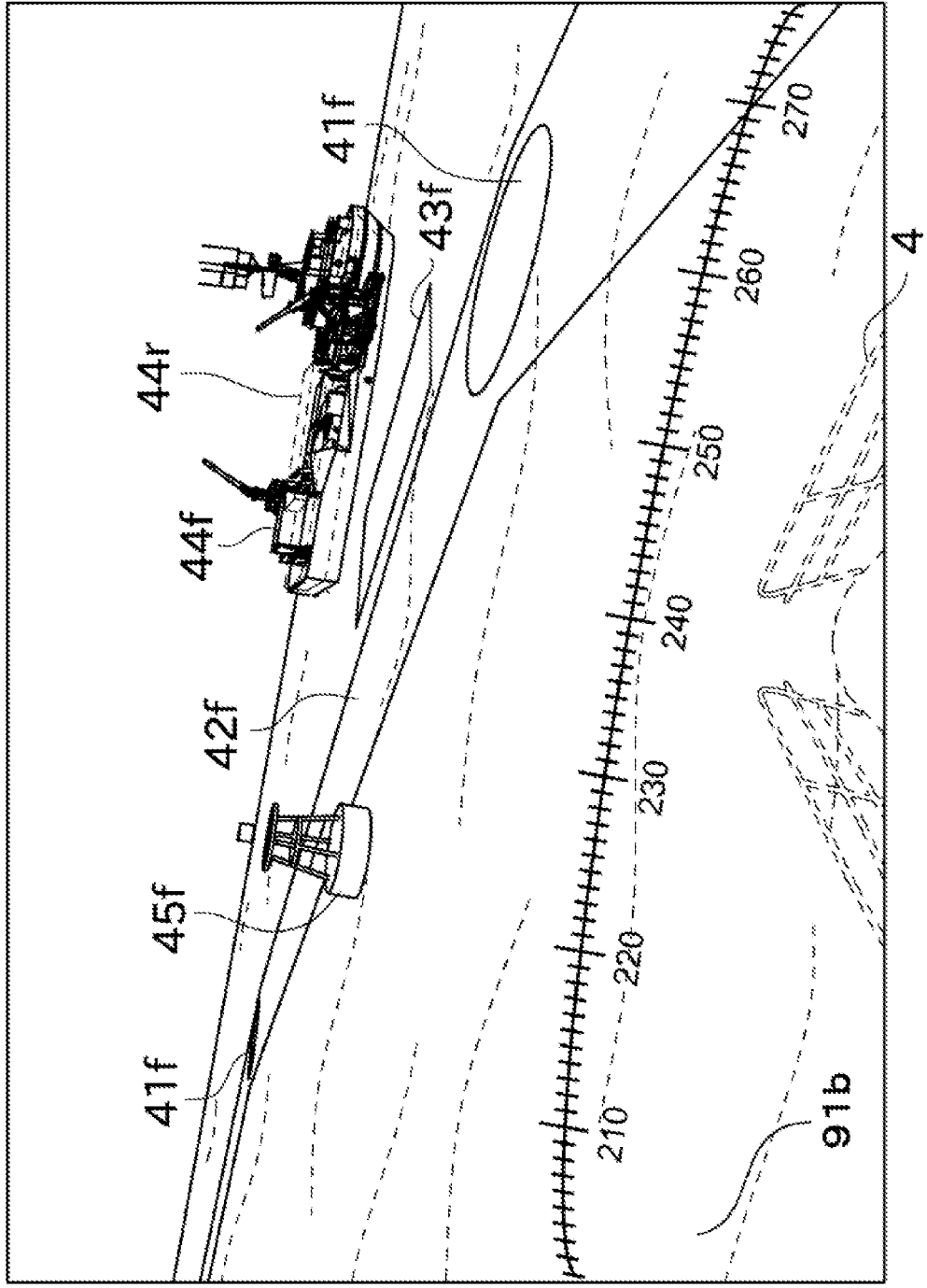
FIG. 14 is Display Example 2 of the direction scale.

When displaying the graphics etc. superimposedly on the image captured by the imaging device as described above, the limited display area can be effectively utilized by simultaneously displaying additional information 91a and 91b, such as the scale images etc. indicative of the direction, as illustrated in FIGS. 13 and 14. At this time, the positions of the additional information may be automatically changed and moved so that the graphics are not hidden by the additional information as much as possible. Moreover, the additional information 91a and 91b may be displayed so as to incline according to the inclination of the hull. By displaying in such a way, exact additional information can always be visually observed even when the hull inclines.

Figure 15:
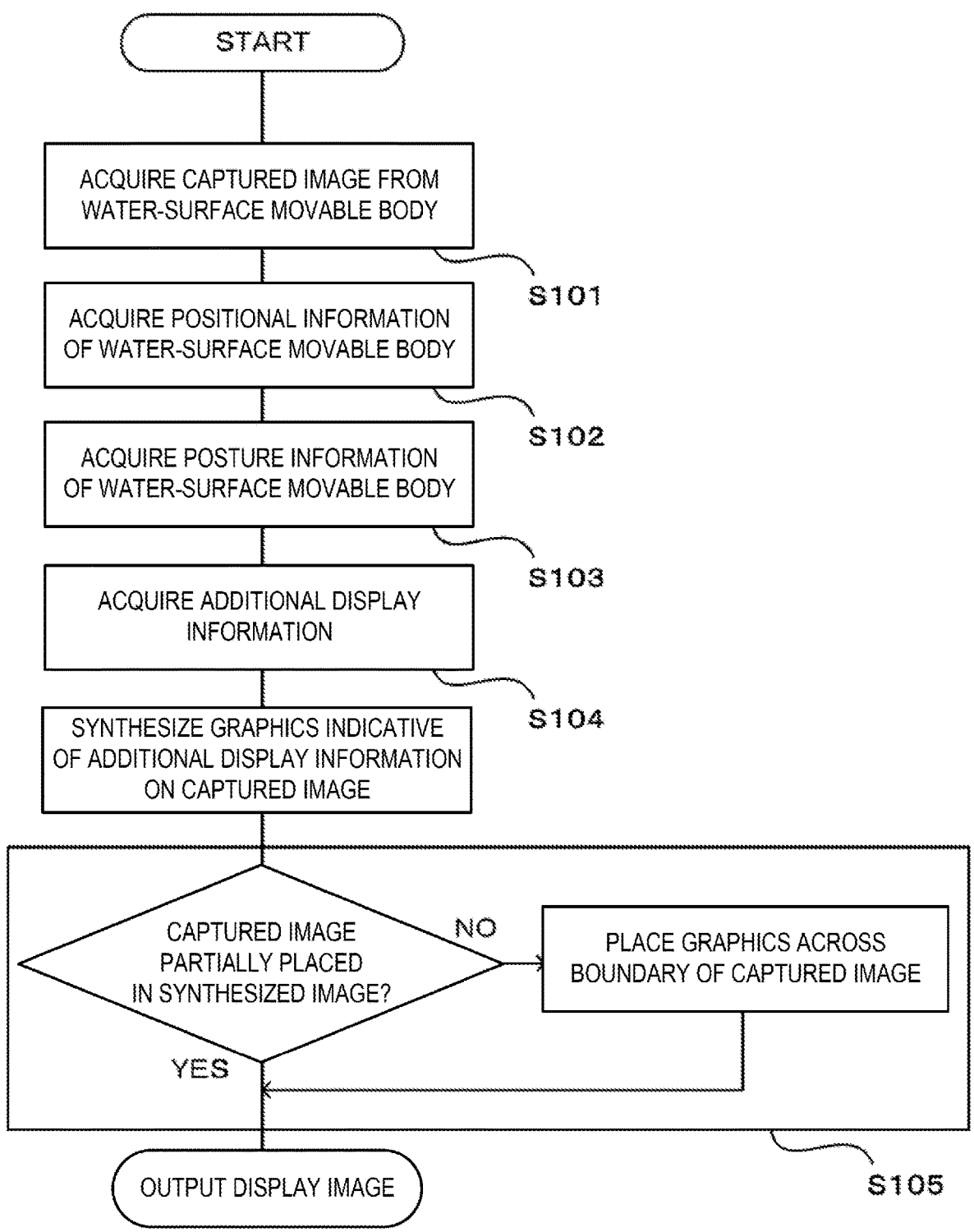
FIG. 15 is a flowchart of a method of generating an image according to one embodiment of the present disclosure.

Processing performed in the embodiment of the present disclosure is described with reference to a flowchart of FIG. 15. In this embodiment, the image captured by the imaging device installed in the water-surface movable body may be inputted (S101). The positional information indicative of the position of the water-surface movable body may be acquired (S102), and the posture information indicative of the posture of the water-surface movable body may be acquired (S103). The additional display information including the information indicative of the positions of one or more locations may be acquired (S104). Based on the positional information, the posture information, and the additional display information, the synthesized image in which the graphics rendering the three-dimensional virtual reality objects indicative of the additional display information are synthesized on the captured image, may be generated. When the captured image is partially placed in the synthesized image, the graphics may be placed across the boundary of the captured image (S105). Therefore, the problems described above are solved.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An image generating device, comprising:
    processing circuitry configured to:
        acquire an image captured by an imaging device to be installed in a water-surface movable body;
        acquire positional information indicative of a position of the water-surface movable body;
        acquire posture information indicative of a posture of the water-surface movable body;
        acquire additional display information including information indicative of positions of one or more locations;
        generate a synthesized image where a graphic rendering a three-dimensional virtual reality object indicative of the additional display information is synthesized on the captured image based on the positional information, the posture information, and the additional display information; and
        place the graphic across a boundary of the captured image when the captured image is placed only in a certain portion of the synthesized image.

2. The image generating device of claim 1, wherein the processing circuitry is further configured to synthesize the graphic rendering the virtual reality object having the shape of a ship with the captured image.

3. The image generating device of claim 2, wherein the processing circuitry is further configured to synthesize with the captured image the graphic rendering the virtual reality object where the additional display information is based on at least any of a length, a width, a bow direction of the ship.

4. The image generating device of claim 2, wherein the processing circuitry is further configured to:
    synthesize a directional scale indicative of an azimuth on the captured image; and
    place the directional scale across the captured image when the captured image is placed only in the certain portion of the synthesized image.

5. The image generating device of claim 4, wherein the processing circuitry is further configured to:
    synthesize a horizon that is a boundary between a water surface and sky with the captured image; and
    place the horizon across the boundary of the captured image when the captured image is placed only in the certain portion of the synthesized image.

6. The image generating device of claim 5, wherein the processing circuitry is further configured to:
    synthesize a grid indicative of a water surface with the captured image; and
    place the grid across the boundary of the captured image when the captured image is placed only in the certain portion of the synthesized image.

7. The image generating device of claim 6, wherein the processing circuitry is further configured to render the boundary of the captured image obscured or emphasized.

8. The image generating device of claim 7, wherein the processing circuitry is further configured to:
    perform, when the captured image is placed in the synthesized image, a posture change tracking in which a rendering position and direction of the virtual reality object are changed corresponding at least to a posture change of an imaging optical axis of the imaging device in the roll direction.

9. The image generating device of claim 8, wherein the processing circuitry is further configured to:
    stop the posture change tracking when the captured image is not placed at all in the synthesized image.

10. The image generating device of claim 1, wherein the processing circuitry is further configured to:
    synthesize a directional scale indicative of an azimuth on the captured image; and
    place the directional scale across the captured image when the captured image is placed only in the certain portion of the synthesized image.

11. The image generating device of claim 1, wherein the processing circuitry is further configured to:
    synthesize a horizon that is a boundary between a water surface and sky with the captured image; and
    place the horizon across the boundary of the captured image when the captured image is placed only in the certain portion of the synthesized image.

12. The image generating device of claim 1, wherein the processing circuitry is further configured to:
    synthesize a grid indicative of a water surface with the captured image; and
    place the grid across the boundary of the captured image when the captured image is placed only in the certain portion of the synthesized image.

13. The image generating device of claim 1, wherein the processing circuitry is further configured to render the boundary of the captured image obscured or emphasized.

14. The image generating device of claim 1, wherein the processing circuitry is further configured to:
    perform, when the captured image is placed in the synthesized image, a posture change tracking in which a rendering position and direction of the virtual reality object are changed corresponding at least to a posture change of an imaging optical axis of the imaging device in the roll direction.

15. The image generating device of claim 1, wherein the processing circuitry is further configured to:
    stop a posture change tracking when the captured image is not placed at all in the synthesized image.

16. The image generating device of claim 1, wherein the processing circuitry is further configured to:
    place at least one of the additional display information as the three-dimensional virtual reality object in a three-dimensional virtual space;
    place the captured image based on the positional information and the posture information;
    generate the synthesized image by rendering the virtual reality object and the captured image based on the position and the direction of a virtual camera located in the three-dimensional virtual space; and
    change at least any of the position and the direction of the virtual camera based on an instruction of a user.

17. The image generating device of claim 16, wherein the processing circuitry is further configured to automatically change at least any of the position and the direction of the virtual camera so that a point in the three-dimensional virtual space, or when the user selects the virtual reality object, the selected point or the selected virtual reality object is continuously included in the synthesized image.

18. The image generating device of claim 1, wherein the processing circuitry is further configured to generate a scale image indicative of an azimuth; and
    determine a display position of the scale image according to the position where the graphic is displayed.

19. A method of generating an image, comprising:
    acquiring an image captured by an imaging device to be installed in a water-surface movable body;
    acquiring positional information indicative of a position of the water-surface movable body;
    acquiring posture information indicative of a posture of the water-surface movable body;
    acquiring additional display information including information indicative of positions of one or more locations;
    generating a synthesized image where a graphic rendering a three-dimensional virtual reality object indicative of the additional display information is synthesized on the captured image based on the positional information, the posture information, and the additional display information; and
    placing the graphic across a boundary of the captured image when the captured image is placed only in a certain portion of the synthesized image.

* * * * *